US012627042B2

(12) United States Patent
Kimball et al.

(10) Patent No.: US 12,627,042 B2
(45) Date of Patent: *May 12, 2026

(54) PHASED ARRAY TRANSCEIVER WITH BUILT-IN PHASE INTERFEROMETER AND/OR TRANSMITTER LINEARIZATION FEEDBACK

(71) Applicant: Murata Manufacturing Co., Ltd., Nagaokakyo (JP)

(72) Inventors: Donald Felt Kimball, El Cajon, CA (US); Carl Einer Tulberg, San Diego, CA (US); Bautista Reinoso, San Diego, CA (US)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,022

(22) Filed: Jul. 18, 2024

(65) Prior Publication Data

US 2024/0372251 A1    Nov. 7, 2024

Related U.S. Application Data

(63) Continuation of application No. 17/558,106, filed on Dec. 21, 2021, now Pat. No. 12,074,380, which is a
(Continued)

(51) Int. Cl.
| | |
|---|---|
| *H01Q 3/26* | (2006.01) |
| *H01Q 3/42* | (2006.01) |
| *H04B 1/04* | (2006.01) |

(52) U.S. Cl.
CPC .............. *H01Q 3/267* (2013.01); *H01Q 3/42* (2013.01); *H04B 1/04* (2013.01); *H04B 2001/0425* (2013.01)

(58) Field of Classification Search
CPC . H01Q 3/267; H01Q 3/42; H04B 1/04; H04B 1/44; H04B 2001/0425
See application file for complete search history.

(56) References Cited

U.S. PATENT DOCUMENTS

| | | |
|---|---|---|
| 4,994,813 A | 2/1991 | Shiramatsu et al. |
| 5,940,029 A | 8/1999 | Ninomiya et al. |

(Continued)

FOREIGN PATENT DOCUMENTS

| | | |
|---|---|---|
| EP | 2290382 A1 | 3/2011 |
| WO | 2020/263852 A1 | 12/2020 |

OTHER PUBLICATIONS

Ng, Eric et al., "Single-Input Single Output Digital Predistortion of Power Amplifier Arrays in Millimeter Wave RF Beamforming Transmitters", *Department of Electrical and Computer Engineering, University of Waterloo, Waterloo, ON, Canada*. IEEE/MTT-S International Microwave Symposium (2018).

(Continued)

*Primary Examiner* — Thien M Le
(74) *Attorney, Agent, or Firm* — Steinfl + Bruno LLP

(57) ABSTRACT

Methods and devices for streamlining phase and amplitude calibration and linearization in RF transceiver circuits including a plurality of switchable transmit and receive processing paths is presented. According to one aspect, switchable feedback paths are provided that can selectively feedback a portion of a transmitted RF signal or a test RF signal for use in the calibration. According to another aspect, the switchable feedback paths include combination of switches and couplers to selectively combine feedback from one or more of the switchable feedback paths. According to another aspect, the switchable feedback paths reuse portions of the receive paths of the plurality of switchable transmit and receive processing paths. The switchable feedback paths can be used to provide a combined feedback RF signal based (Continued)

300

4X (130', 130", 130''', 130'''')

4X (140', 140", 140''', 140'''')

on one or more transmitted RF signals that can be used as a digital pre-distortion feedback for linearization of the one or more transmitted RF signals.

25 Claims, 23 Drawing Sheets

Related U.S. Application Data continuation of application No. PCT/US2020/039173, filed on Jun. 23, 2020, which is a continuation-in-part of application No. 16/601,302, filed on Oct. 14, 2019, now Pat. No. 10,715,199, and a continuation-in-part of application No. 16/455,517, filed on Jun. 27, 2019, now Pat. No. 10,965,026, said application No. 16/601,302 is a continuation of application No. 16/455,427, filed on Jun. 27, 2019, now Pat. No. 10,484,038.

(56) References Cited

U.S. PATENT DOCUMENTS

| | | | |
|---|---|---|---|
| 6,625,424 B1 | 9/2003 | Mohindra | |
| 7,248,120 B2 | 7/2007 | Burgener et al. | |
| 7,392,015 B1 | 6/2008 | Farlow et al. | |
| 7,408,507 B1 | 8/2008 | Paek et al. | |
| 7,764,935 B2 | 7/2010 | Pallonen | |
| 8,045,926 B2 | 10/2011 | Martikkala et al. | |
| 8,106,826 B2 * | 1/2012 | Fox | H01Q 3/2652 342/372 |
| 8,340,612 B2 * | 12/2012 | Schlee | H01Q 3/267 342/368 |
| 8,451,942 B2 | 5/2013 | Otaka et al. | |
| 9,035,828 B2 | 5/2015 | O'Keeffe et al. | |
| 9,184,857 B2 | 11/2015 | Vassiliou et al. | |
| 9,628,256 B2 | 4/2017 | O'Keeffe et al. | |
| 9,717,008 B1 | 7/2017 | Sharma | |
| 9,762,283 B2 | 9/2017 | Chen et al. | |
| 9,780,447 B2 * | 10/2017 | Maca | H01Q 13/203 |
| 9,838,140 B1 | 12/2017 | Crivelli et al. | |
| 10,056,685 B2 | 8/2018 | Haddad et al. | |
| 10,484,038 B1 * | 11/2019 | Kimball | H04B 17/12 |
| 10,715,199 B1 | 7/2020 | Kimball | |
| 10,965,026 B2 | 3/2021 | Kimball | |
| 12,074,380 B2 | 8/2024 | Kimball et al. | |
| 2005/0239419 A1 | 10/2005 | Fudaba et al. | |
| 2009/0267824 A1 | 10/2009 | Cooper et al. | |
| 2012/0027066 A1 | 2/2012 | O'Keeffe | |
| 2012/0028587 A1 * | 2/2012 | Ferguson | H04B 17/12 455/67.14 |
| 2014/0184439 A1 * | 7/2014 | Ainspan | G01S 7/024 342/188 |
| 2014/0242914 A1 | 8/2014 | Monroe | |
| 2015/0207536 A1 * | 7/2015 | Yehezkely | H04B 1/44 455/78 |
| 2016/0308563 A1 * | 10/2016 | Ouyang | H01Q 25/005 |
| 2018/0246204 A1 * | 8/2018 | Ding | G01S 7/03 |
| 2020/0411981 A1 * | 12/2020 | Kimball | H04B 1/44 |
| 2022/0140479 A1 * | 5/2022 | Kimball | H01Q 3/267 343/702 |

OTHER PUBLICATIONS

Yao, Miao et al., "A Digital Predistortion Scheme Exploiting Degrees of Freedom for Massive MIMO Systems", Department of Electrical and Computer Engineering, Virginia Tech, published as arXiv: 1801.06023v1 [eess. SP] (Jan. 18, 2018).

* cited by examiner

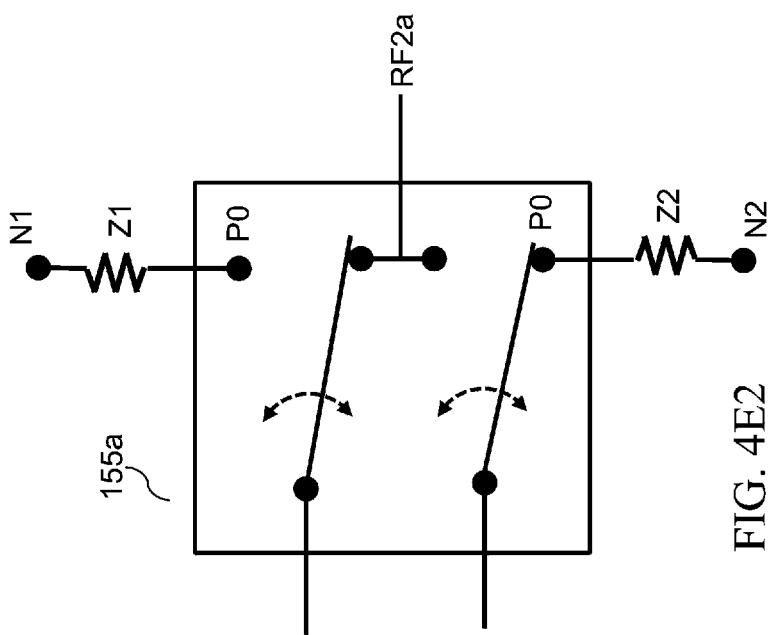
FIG. 4E2
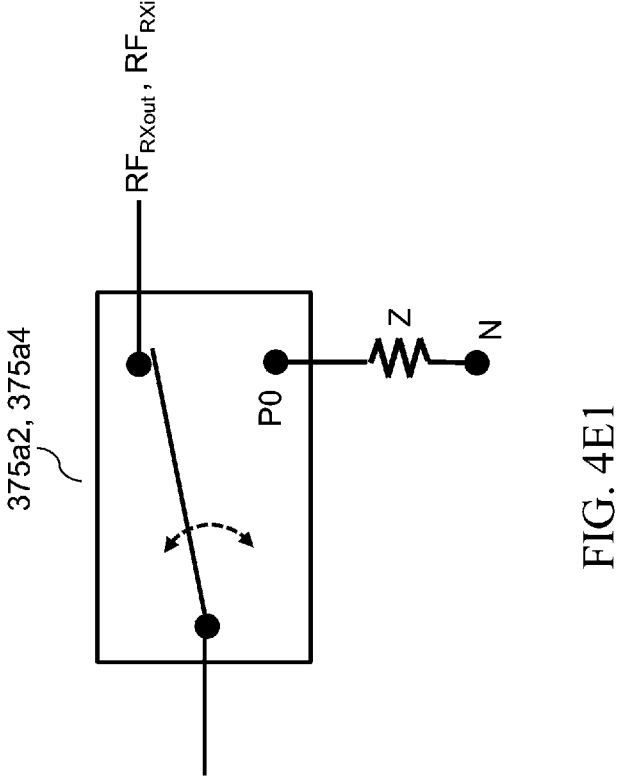
FIG. 4E1

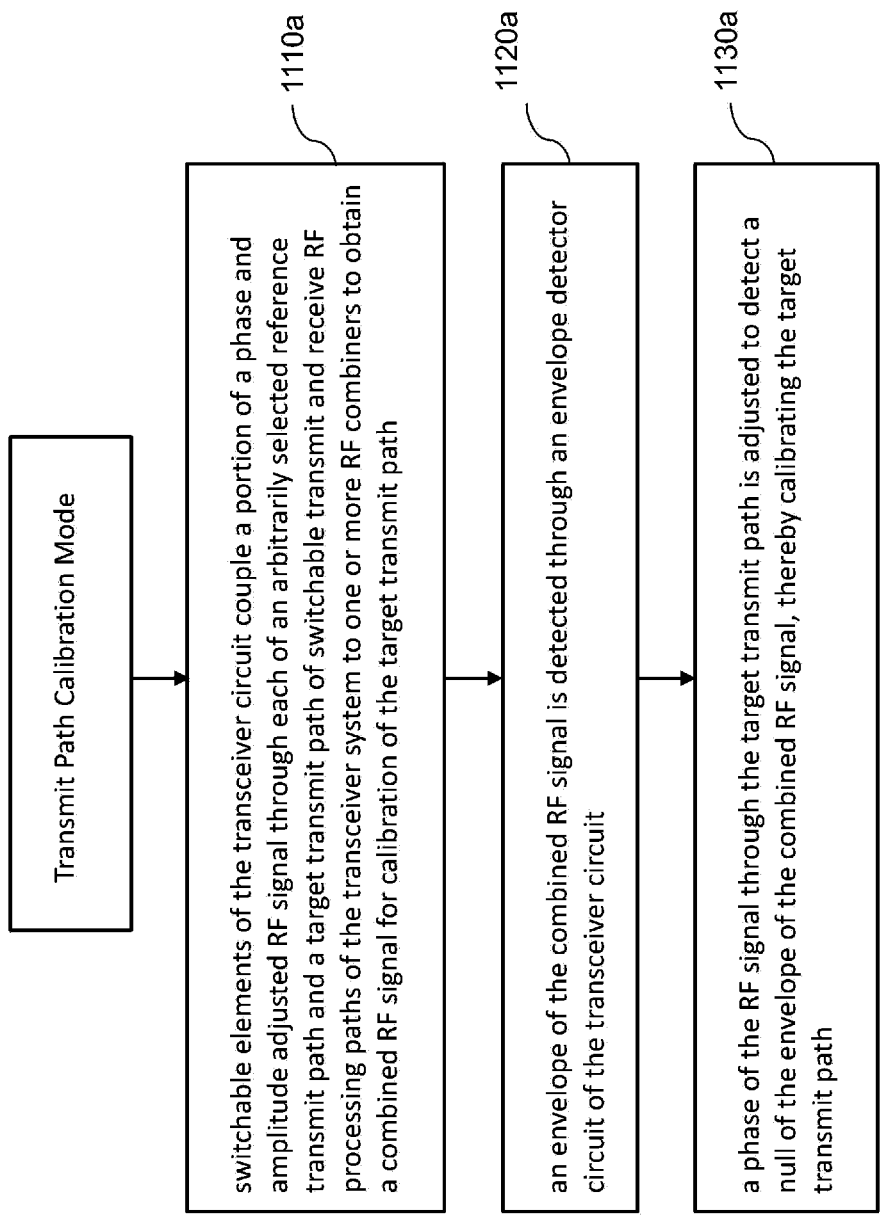

Transmit Path Calibration Mode switchable elements of the transceiver circuit couple a portion of a phase and amplitude adjusted RF signal through each of an arbitrarily selected reference transmit path and a target transmit path of switchable transmit and receive RF processing paths of the transceiver system to one or more RF combiners to obtain a combined RF signal for calibration of the target transmit path 1110a an envelope of the combined RF signal is detected through an envelope detector circuit of the transceiver circuit 1120a a phase of the RF signal through the target transmit path is adjusted to detect a null of the envelope of the combined RF signal, thereby calibrating the target transmit path 1130a 1100a

FIG. 11A

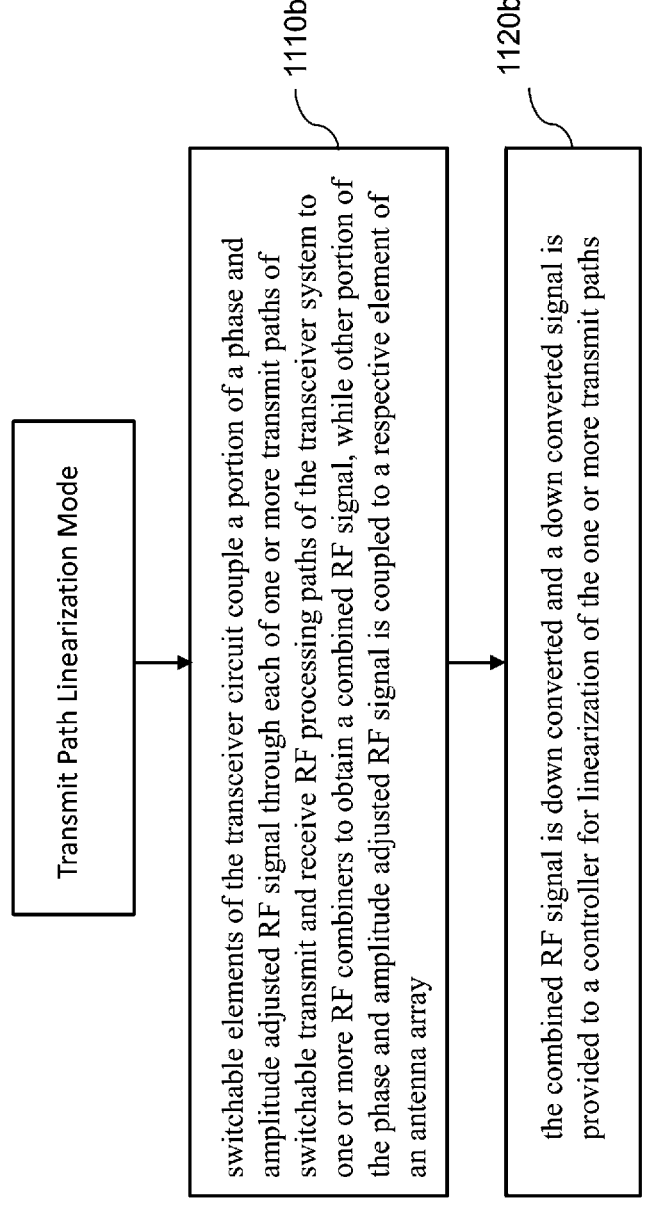

Transmit Path Linearization Mode

1110b switchable elements of the transceiver circuit couple a portion of a phase and amplitude adjusted RF signal through each of one or more transmit paths of switchable transmit and receive RF processing paths of the transceiver system to one or more RF combiners to obtain a combined RF signal, while other portion of the phase and amplitude adjusted RF signal is coupled to a respective element of an antenna array 1120b the combined RF signal is down converted and a down converted signal is provided to a controller for linearization of the one or more transmit paths

PHASED ARRAY TRANSCEIVER WITH BUILT-IN PHASE INTERFEROMETER AND/OR TRANSMITTER LINEARIZATION FEEDBACK

CROSS REFERENCE TO RELATED APPLICATIONS

The present application is a continuation application of U.S. application Ser. No. 17/558,106 filed on Dec. 21, 2021, which is incorporated herein by reference in its entirety and is a continuation application of PCT application PCT/US2020/039173 filed on Jun. 23, 2020, the disclosure of which is incorporated herein by reference in its entirety, which PCT application is, in turn, a continuation in part application of i) U.S. application Ser. No. 16/455,517 filed on Jun. 27, 2019 and issued as U.S. Pat. No. 10,965,026 on Mar. 30, 2021, the disclosure of which is also incorporated herein by reference in its entirety and ii) U.S. application Ser. No. 16/601,302 filed on Oct. 14, 2019 and issued as U.S. Pat. No. 10,715,199 on Jul. 14, 2020, the disclosure of which is also incorporated herein by reference in its entirety. U.S. application Ser. No. 16/601,302 is, in turn, a continuation application of U.S. application Ser. No. 16/455,427 filed on Jun. 27, 2019 and issued as U.S. Pat. No. 10,484,038 on Nov. 19, 2019, the disclosure of which is also incorporated herein by reference in its entirety. The present application may also be related to U.S. Pat. No. 9,717,008, entitled "Integrated Circuit Calibration Architecture", issued Jul. 25, 2017, the disclosure of which is incorporated herein by reference in its entirety.

TECHNICAL FIELD

The present teachings relate to RF (radio frequency) circuits. More particularly, the present teachings relate to methods and apparatuses for streamlining phase and amplitude calibration and linearization in RF transceiver circuits that can be used in beam forming and/or steering applications.

BACKGROUND

The advent of next-generation 5G standard for millimeter-wave cellular communication has pushed the design of hybrid multiple-input multiple-output (MIMO) transceiver systems for interfacing with antenna array to provide directional signal transmission or reception. Signal processing techniques, such as beam forming or beam steering that can provide for the necessary spatial filtering, are implemented by a combination of digital and analog circuit blocks in the transceiver systems. Such transceiver systems may be based on time division duplex (TDD) mode of operation where transmission and reception are performed via a plurality of transmit paths and receive paths that operate at a same frequency but are activated at different time slots.

Performance in beam forming/steering may be dependent on accuracy by which the transceiver can generate phase and amplitude information to the many elements of the antenna array, and/or on accuracy by which the transceiver can extract phase and amplitude information from the many elements of the antenna array. Accordingly, calibration of a phase and amplitude adjustment block in the plurality of transmit and receive paths of the transceiver becomes a requirement, especially in mass production environments where wider tolerances in lower cost standard components may invariably introduce performance variation.

Some challenges associated with calibration of the transceiver include the high number of ports from/to which test signals must be read/injected, as well as the millimeter-wave nature of signals of interest. Description of some such challenges and implementation examples can be found, for example, in the above referenced U.S. Pat. No. 9,717,008. Furthermore, it may be desirable to reduce built-in test circuits related to the calibration, as such test circuits may not only increase a physical size of the transceiver but may also introduce undesired couplings between the different transmit and receive paths of the transceiver. Such couplings in turn may affect performance of the beam forming/steering, including in applications where (patch) elements of the antenna are fed with (horizontal and vertical) polarized RF signals.

Furthermore, requirements for higher power output from power amplifiers (PAS) used in transmit paths of transceivers that are used in, for example, base stations, may require the PAs to operate away from the power back-off condition (e.g., linear region). Accordingly, any such PAs may operate in a non-linear region (i.e., saturation) with resulting output phase and amplitude distortion that may negatively affect performance of the PA in exchange for higher output power and efficiency of the PA. Such trade-off between efficiency and linearity has been neutralized by current digital pre-distortion (DPD) schemes which may realize a linear response of a combined DPD and PA block by cascading the PA and its inverse block. As can be taken from the related references [1] and [2], which are incorporated herein by reference in their entirety, such DPD schemes may require a separate feedback path from the output of each PA, and therefore from each transmit path, to an input of a digital signal processor implementing the DPD functionality. It would be clear to a person skilled in the art that such feedback paths may cause the same challenges and problems associated with added circuits as described above with reference to the calibration of the phase and amplitude adjustment blocks of the transceiver.

Teachings according to the present disclosure aim to simplify complexity of transceivers used in beam forming/steering applications or other applications wherein the transceivers couple to a large number of antenna elements, thereby overcoming some of the challenges and problems associated with, for example, calibrating individual transmit and/or receive paths and/or instrumenting the transceivers for implementation of DPD schemes as described above.

SUMMARY

According to a first aspect of the present disclosure, a transceiver circuit is presented, the transceiver circuit comprising: a) switchable transmit and receive RF processing paths, each selectively configured to operate according to one of: a1) a transmit path for adjusting phase and amplitude of an RF signal for transmission through a respective element of a plurality of elements of an antenna array, and a2) a receive path for adjusting phase and amplitude of an RF signal received through the respective element of the antenna array; b) switchable feedback paths selectively coupled to the switchable transmit and receive RF processing paths via switchable elements of said feedback paths; and c) one or more RF combiners coupled to the switchable feedback paths, wherein said switchable feedback paths are selectively configured to operate according to at least a transmit path calibration mode, and wherein during the transmit path calibration mode, the switchable elements couple a portion of a phase and amplitude adjusted RF signal through each of an arbitrarily selected reference transmit path and a target transmit path of the switchable transmit and receive RF processing paths to the one or more RF combiners to obtain a combined RF signal for calibration of the target transmit path.

According to a second aspect of the present disclosure, a method for calibrating RF paths of a transceiver circuit used in a time division duplex system is presented, the method comprising a transmit path calibration mode, wherein during the transmit path calibration mode: a1) switchable elements of the transceiver circuit couple a portion of a phase and amplitude adjusted RF signal through each of an arbitrarily selected reference transmit path and a target transmit path of switchable transmit and receive RF processing paths of the transceiver system to one or more RF combiners to obtain a combined RF signal for calibration of the target transmit path, a2) an envelope of the combined RF signal is detected through an envelope detector circuit of the transceiver circuit, and a3) a phase of the RF signal through the target transmit path is adjusted to detect a null of the envelope of the combined RF signal, thereby calibrating the target transmit path, and wherein the transceiver circuit comprises: b) a plurality of the switchable transmit and receive RF processing paths, each selectively configured to operate according to one of: b1) a transmit path for adjusting phase and amplitude of an RF signal for transmission through a respective element of a plurality of elements of an antenna array, and b2) a receive path for adjusting phase and amplitude of an RF signal received through the respective element of the antenna array.

According to a third aspect of the present disclosure, a transceiver circuit is presented, the transceiver circuit comprising: a) switchable transmit and receive RF processing paths, each selectively configured to operate according to one of: a1) a transmit path for adjusting phase and amplitude of an RF signal for transmission through a respective element of a plurality of elements of an antenna array, and a2) a receive path for adjusting phase and amplitude of an RF signal received through the respective element of the antenna array; b) switchable feedback paths selectively coupled to the switchable transmit and receive RF processing paths via switchable elements of said feedback paths; and c) one or more RF combiners coupled to the switchable feedback paths, wherein said switchable feedback paths are selectively configured to operate according to at least a transmit path linearization mode, and wherein in the transmit path linearization mode, i) one or more transmit paths of the switchable transmit and receive RF processing paths are each coupled to the respective element of the antenna array, and ii) the switchable elements couple a portion of a phase and amplitude adjusted RF signal through each of the one or more transmit paths to the one or more RF combiners to obtain a combined RF signal that is configured to be used by a controller for linearization of the one or more transmit paths.

According to a fourth aspect of the present disclosure, a method for linearizing RF paths of a transceiver circuit used in a time division duplex system is presented, the method comprising a transmit path linearization mode, wherein during the transmit path linearization mode: a1) switchable elements of the transceiver circuit couple a portion of a phase and amplitude adjusted RF signal through each of one or more transmit paths of switchable transmit and receive RF processing paths of the transceiver system to one or more RF combiners to obtain a combined RF signal, while other portion of the phase and amplitude adjusted RF signal is coupled to a respective element of an antenna array, and a2)

the combined RF signal is down converted and a down converted signal is provided to a controller for linearization of the one or more transmit paths, and wherein the transceiver circuit comprises: b) a plurality of the switchable transmit and receive RF processing paths, each selectively configured to operate according to one of: b1) a transmit path for adjusting phase and amplitude of an RF signal for transmission through the respective element of a plurality of elements of the antenna array, and b2) a receive path for adjusting phase and amplitude of an RF signal received through the respective element of the antenna array.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 4E1 and FIG. 4E2 show exemplary embodiments of couplings to unused poles of switches used in the transceiver system.

FIG. 11A is a process chart showing a method for calibrating RF paths of a transceiver circuit used in a time division duplex system, the method comprising a transmit path calibration mode.

FIG. 11B is a process chart showing a method for linearizing RF paths of a transceiver circuit used in a time division duplex system, the method comprising a transmit path linearization mode.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein.

The present disclosure describes electrical circuits (circuital arrangements) in electronics devices (e.g., cell phones, radios) having a plurality of devices, such as for example, transistors (e.g., MOSFETs). Persons skilled in the art will appreciate that such electrical circuits comprising transistors can be arranged as amplifiers.

The term "amplifier" as used in the present disclosure may to refer to amplifiers comprising stacked transistors configured as amplifiers or other amplifiers known in the art that do not use stacked transistors, and can be used, for example, as power amplifiers (PAS) and/or low noise amplifiers (LNAs). An amplifier can refer to a device that is configured to amplify a signal input to the device to produce an output signal of greater magnitude than the magnitude of the input signal. Stacked transistor amplifiers, in particular stacked transistor amplifiers operating as a cascode configuration, are described for example in U.S. Pat. No. 7,248,120, issued on Jul. 24, 2007, entitled "Stacked Transistor Method and Apparatus", the disclosure of which is incorporated herein by reference in its entirety. As used herein, the term "amplifier" can also be applicable to amplifier modules and/or power amplifier modules having any number of stages (e.g., pre-driver, driver, final), as known to those skilled in the art. As used herein the term "low noise amplifier" or "LNA" are intended to refer to an amplifier comprising a degeneration impedance that comprises an inductor. It is possible that the techniques in this invention apply to a common gate input topology as well.

Figure 1A:
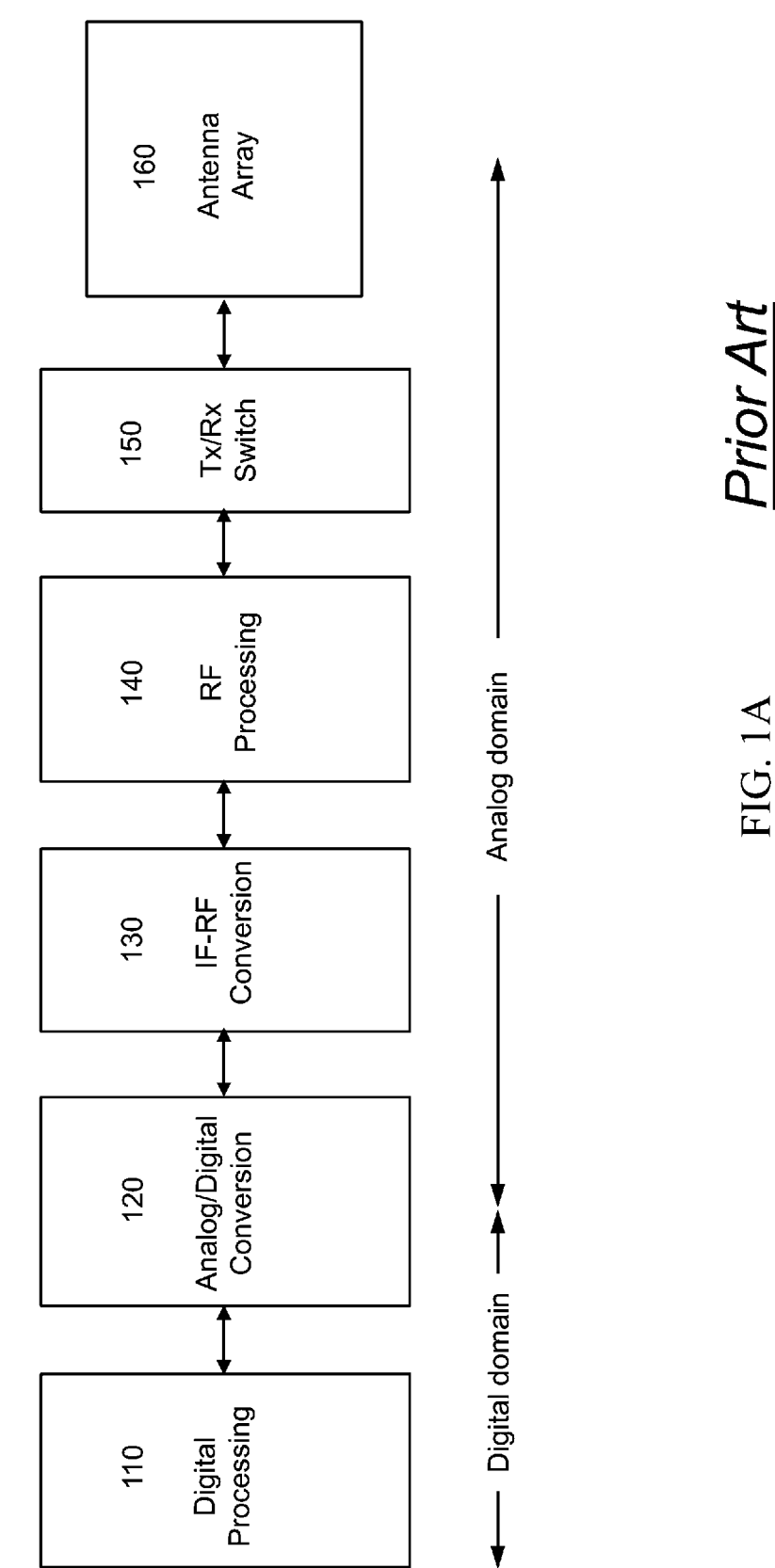
FIG. 1A shows a simplified block diagram of a prior art transceiver system.
Figure 1B:
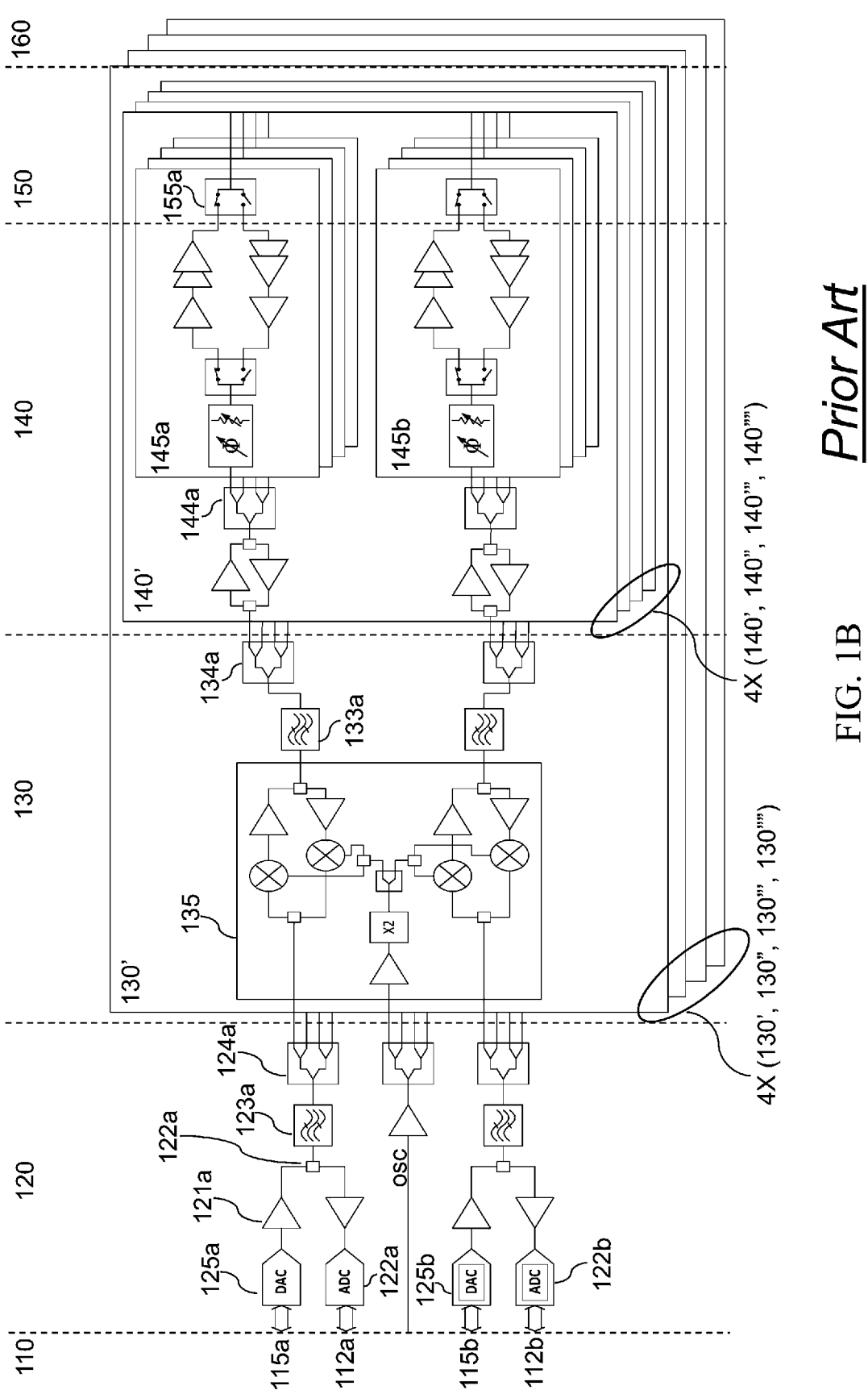
FIG. 1B shows a simplified schematic representation of an exemplary circuit implementation of the prior art transceiver system of FIG. 1A.

FIG. 1A shows a simplified block diagram of a prior art transceiver system (100), including a digital processing block (110), an analog/digital conversion block (120), an IF-RF block (130), an RF processing block (140), a Tx/Rx switch block (150), and an antenna array (160). The transceiver system (100) may include a plurality of transmit and receive paths for respective transmission and reception of a plurality of RF signals via the antenna array (160). As described above, the transceiver system (100) may be used in beam forming/steering applications where phase and amplitude of the plurality of RF signals are controlled to generate constructive interference at selected beam angles radiating from the antenna array and destructive interference at other beam angles. As the beam forming/steering may be used in reception and transmission, the plurality of transmit paths and the plurality of receive paths may include phase and amplitude adjustment blocks. As shown in FIG. 1B later described, such phase and amplitude adjustment blocks may be bidirectional, in other words, one such block may provide a same signal path during reception and transmission. It should be noted that as used herein, a block is referred to a circuit designed for a specific functionality, wherein the circuit may be partitioned according to any number of schemes known in the art, including one or more of a board, a module, an integrated circuit, or other schemes known in the art.

With continued reference to FIG. 1A, as it is well known to a person skilled in the art, the digital processing block (110) may operate in the digital domain to, for example, generate modulated data signals (e.g., 64, 128, 256 QAM or other) for transmission through the antenna array (160) and to demodulate received data signals from the antenna array (160). The analog/digital conversion block (120) may translate the modulated data signals from digital to analog for further processing in the analog domain by blocks (130, 140, 150) of the transceiver (100) prior to transmission via the antenna array (160), and translate the received data signals from analog to digital for further processing in the digital domain by the digital processing block (110). The IF-RF block (130) may perform up conversion and down conversion between a lower intermediate frequency (IF) for processing in the digital domain (e.g., block 110) and a higher RF frequency (e.g., 28 GHz and higher) for processing in the analog domain (e.g., block 140, 150, 160).

With continued reference to FIG. 1A, the RF processing block (140) may perform amplitude and phase control of the plurality of RF signals for transmission/reception via the antenna array. As shown in FIG. 1B later described, transmission and reception of an RF signal for each of the plurality of transmit and receive paths may respectively be provided via a respective power amplifier (PA) and low noise amplifier (LNA). The Tx/Rx switch block (150) may selectively couple a transmit path or a receive path of the transceiver to an element of the antenna array (160) for respective transmission or reception of an RF signal via the element of the antenna array (160). In a case where the antenna array (160) is used for beam forming/steering, the Tx/Rx switch block (150) may simultaneously couple a plurality of transmit paths or a plurality of receive paths for respective transmission or reception of a beam. Furthermore, the Tx/Rx switch block (150) may be used in implementation of time division duplex (TDD) mode of operation of the transceiver system (100) wherein the transmit paths and receive paths are temporally separated.

FIG. 1B shows a simplified schematic of an exemplary circuit implementation of the prior art transceiver system (100) of FIG. 1A, including blocks (120, 130, 140, 150). In the exemplary implementation shown in FIG. 1B, a single dual-polarization (e.g., horizontal and vertical), channel of the digital processing block (110) is used to communicate (interface) with sixty-four elements of the antenna array (160). In other words, the single dual-polarization channel is used to generate data signals (e.g., transmit data (115a, 115b)) for processing through sixty-four separate pairs of transmit paths of the transceiver system (100) prior to transmission via sixty-four elements of the antenna array (160), and to decode data signals received (e.g., receive data (112a, 112b)) via sixty-four elements of the antenna array (160) and processed through sixty-four separate pairs of receive paths of the transceiver system (100). Accordingly, as can be clearly seen in FIG. 1B, symmetrical circuits are provided for processing (e.g., transmit and receive) of each of the (horizontal and vertical) polarizations, indicated in the figure with elements designated with suffices a and b in their respective reference designators. Due to the symmetrical nature of the implementation, the following description is provided mainly with respect to one of the symmetrical circuits.

With further reference to FIG. 1B, each of the blocks (120), (130), (140) and (150) includes a main functional element to implement a specific function of the block. For example, the analog/digital conversion block (120) includes a digital-to-analog conversion (DAC) circuit (125) to receive data signals (115a) to be transmitted from the block (110) and an analog-to-digital conversion (ADC) circuit (122a) to feed data signals (112a) received from the antenna array (160) to the block (110); the IF-RF block (130) includes a dual polarization mixer (135) for up and down conversion of the data signals; the RF processing block (140), with further details shown in FIG. 1C later described, includes a plurality (e.g., sixty-four per polarization) of (switchable) transmit and receive RF processing paths (145a) with adjustable amplitude and phase features to implement, for example, beam forming/steering; and the Tx/Rx switch block (150) includes a plurality (e.g., sixty-four per polarization) of (antenna) switches (155a) to selectively couple one of the transmit and receive RF processing paths (145a) to sixty-four elements of the antenna array (160).

With continued reference to FIG. 1B, the blocks (120), (130) and (140) may further include signal conditioning elements such as buffers (e.g., 121a), filters (e.g., 123a, 133a) and power combiners/dividers (e.g., 124a, 134a, 144a), as well as switches (e.g., 122a), wherein elements in FIG. 1B depicted with same shapes indicate like elements. It should be noted that such elements and their application in a transceiver as exemplified in FIG. 1B are well known in the art. For example, it is well known in the art to include a low pass filter (e.g., 123a) after a digital-to-analog conversion (e.g., 125a) to remove digital conversion noise, or before an analog-to-digital conversion (e.g., (122a)) to remove any unwanted higher frequency components that may be present on the signal to be digitized. It is also well known in the art to include a band pass filter (e.g., 133a) after up conversion or before down conversion to reject an unwanted image or frequency spectrum. It is also well known in the art to use buffers (e.g., 121a) to strengthen signals and/or adapt the signals to reduce loss (e.g., impedance matching) when coupled to other elements (e.g., 122a, 123a).

With continued reference to FIG. 1B, because the blocks (120, 130, 140) communicate with a single data channel (115a, 112a) of the block (110), power combiners/dividers (e.g., 124a, 134a, 144a) are used to divide the transmit data signal (115a) into a plurality of RF signals for transmission via elements of the antenna array (160) and to combine a plurality of RF signals received via elements of the antenna array (160) to generate the receive data signal (112a). A well-known in the art power combiner/divider is a Wilkinson power combiner/divider (e.g., element (344a) shown in FIG. 5 later described) which may combine a plurality of RF signals into one RF signal or vice versa. In some cases, the power combiners/dividers may be replaced by a combination of one or more switches, couplers, and series or parallel impedances that in combination combine a plurality of RF signals into one RF signal or divide one RF signal into a plurality of RF signals. Various implementations of such power combiners/dividers are well known in the art and are outside the scope of the present disclosure.

In order to implement temporal selectivity between transmission and reception of data signals through the blocks (120, 130, 140) shown in FIG. 1B, switches (e.g., 122a) are used to selectively couple bidirectional signal paths that can be shared during transmission and reception to unidirectional transmit or receive signal paths. For example, during transmission, switch (122a) may couple a (unidirectional) signal path from the transmit data signal (115a) to the (bidirectional) low pass filter (123a), and during reception, the switch (122a) may couple a (unidirectional) signal path to the receive data signal (115a) to the (bidirectional) low pass filter (123a). Such bidirectional signal paths may be provided by elements of the blocks (120, 130, 140) that can operate in both transmit and receive modes, such as, for example, the power combiners/dividers (e.g., 123a, 133a, 144a), the filters (e.g., 123a, 133a), as well as phase and amplitude adjustment blocks (e.g., 148a of FIG. 1C) of the switchable transmit and receive RF processing paths (145a) as described later with reference to FIG. 1C. Furthermore, although not shown in FIG. 1B, such elements that provide bidirectional signal paths may be adjustable so to independently optimize performance of the path when operating in each of the transmit and receive direction. Adjustment may be provided by way of control lines under control of a signal aware controller, such as, for example, the digital signal processing block (110), and may affect one or more of an amplitude and phase of a signal passing through the path (which can be different for each direction).

It should be noted that the circuit shown in FIG. 1B may not represent transceiver (110) of FIG. 1A in its entirety but rather may represent one part of such transceiver that communicates with one channel (e.g., dual-polarized transmit data (115a, 115b) and receive data (112a, 112b)) of a plurality of channels of the digital signal processing block (110). Accordingly, the transceiver system may include a plurality of circuits similar to one depicted in FIG. 1B, each such circuit communicating with one channel of the plurality of channels. For example, if the circuit of FIG. 1B communicates with sixty-four elements of the antenna array (160), four such circuits may be used to communicate with an antenna array having two hundred fifty-six (256) elements.

It should be noted that the circuit shown in FIG. 1B represents one of many possible architectures for providing a communication interface between elements of the antenna array (160) and the single dual-polarized channel of the digital processing block (110). As shown in the exemplary configuration of FIG. 1B, during transmission, a power combiner/divider (124a) of the analog/digital conversion block (120) divides a signal into four signals of substantially equal power which are each fed to one of four sub-circuits (130', 130", 130''', 130"") of the IF-RF block (130), wherein FIG. 1B shows one such sub-circuit (130'). In turn, sub-circuit (130') processes one of the four divided signals and further divides, via a power divider/combiner (134a), the processed divided signal into four signals of substantially equal power which are each fed to one RF processing sub-circuit (140') of four RF processing sub-circuits (140', 140", 140''', 140"") of the RF processing block (140). Finally, sub-circuit (140') processes one of the four (twice-) divided signals and further divides, via a power divider/ combiner (144a), the processed divided signal into four signals of substantially equal power which are each fed to one of four switchable RF processing paths (145a) of the RF processing sub-circuit (140').

With continued reference to FIG. 1B, According to the exemplary prior art configuration of FIG. 1B, for each of the two polarizations (e.g., represented by suffices a and b in the reference designators), there are sixty-four (4×4×4) switchable RF processing paths (145a) equally partitioned into four RF processing sub-circuits (140', 140", 140''', 140"") which are each equally partitioned into four sub-circuits (130', 130", 130''', 130""). During reception, signals in the receive paths are combined via reverse paths provided by the power dividers/combiners (144a, 134a, 124a). Such partitioning may be in view of design goals and performances which may take into account, for example, a desired level of integration, cost and physical size. For example, the (four) switchable RF processing paths (145a) may be monolithically integrated and embedded on a same die that forms a module for each of the four sub-circuits (140', 140", 140''', 140""). In turn, the modules (140', 140", 140''', 140"") may be arranged on each of the sub-circuit (130', 130", 130''', 130""), etc.

A person skilled in the art would clearly understand that by placing the various power dividers/combiners (e.g., 124a, 134a, 144a) at different positions in the blocks (120, 130, 140), different partitioning of the communication interface between elements of the antenna array (160) and the single dual-polarized channel ((115a, 115b), (112a, 112b)) of the digital processing block (110) can be obtained. For example, by removing all of the power dividers/combiners (124a, 134a, 144a), the single dual-polarized channel ((115a, 115b), (112a, 112b)) may communicate only to a single element of the antenna array (160) through a single switchable RF processing path (145a), and accordingly sixty-four different channels of the digital processing block (110), each channel communicating via a circuit similar to one shown in FIG. 1B (with only 130', 140', and a single 145a) may be required to provide same functionality as one provided by the circuit shown in FIG. 1B.

Figure 1C:
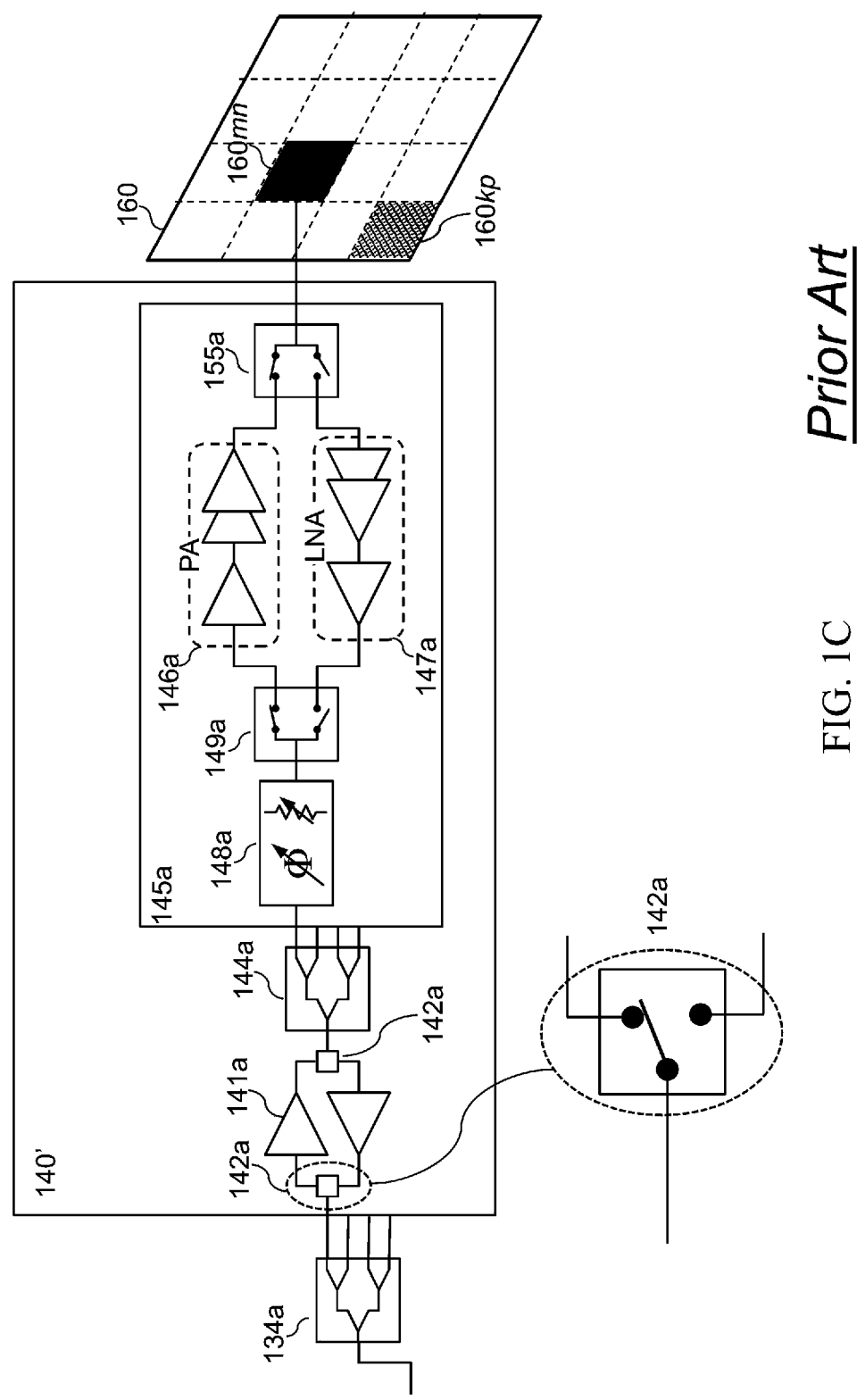
FIG. 1C shows details of an RF processing sub-circuit of the prior art transceiver system of FIG. 1A.

FIG. 1C shows details of the RF processing sub-circuit (140') comprising a plurality of the switchable transmit and receive RF processing path (145a, only one showed for clarity). Switches (142a, 142a, 149a, 155a) determine mode of operation between transmission and reception by coupling an RF signal path to an element (160mn) of the antenna array (160) through a power amplifier (PA, 146a) for transmission, or to a low noise amplifier (LNA, 147a) for reception. As shown in FIG. 1C, the RF processing sub-circuit (140') is set for transmission mode of operation. Accordingly, switches (142a, 142a) are set so that an RF signal provided via the power divider/combiner (134a) is routed through a buffer (141a), then is divided into four RF signals of substantially equal power by the power divider/ combiner (144a), each fed to a switchable transmit and receive RF processing path (145a). The divided RF signal passes through a phase and amplitude adjustment block (148a) where a phase and amplitude of the divided RF signal can be adjusted in view, for example, of a beam forming/ steering application. It should be noted that although description according to the present disclosure is made with respect to both phase and amplitude adjustments of the RF signal processed by the switchable transmit and receive RF processing paths (145a), according to some embodiments, phase adjustment only may be sufficient to provide desired beam forming/steering performance or other sought after performance. In other words, the block (148a) may comprise at least phase adjustment capability. Switches (149a, 155a) are set so that the RF signal is amplified by the PA (146a) and transmitted to the element (160mn) of the antenna array (160). During reception mode of operation, the switches (142a, 142a, 149a, 155a) are set to provide a conduction path from the element (160mn) of the antenna array (160) through the LNA (147a), the phase and amplitude adjustment block (148a), the power divider/combiner (144a), the buffer (141a, lower one shown in the figure), and to the power divider/combiner (134a), where the power dividers/ combiners (144a, 134a) respectively combine RF signals from other elements (e.g., 160kp) of the antenna array (160).

Figure 2:
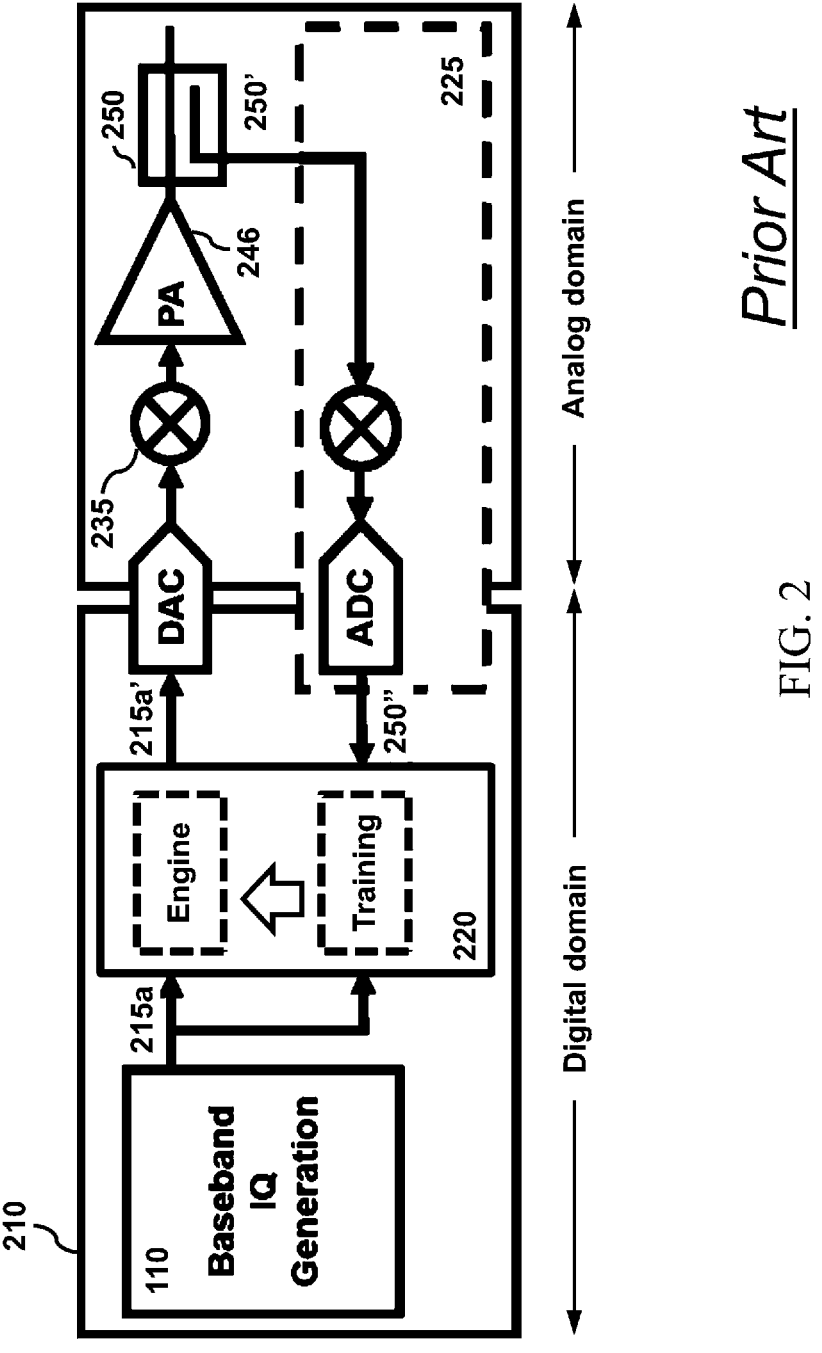
FIG. 2 shows a simplified block diagram of a prior art digital pre-distortion (DPD) implementation for a single power amplifier.

FIG. 2 shows a simplified block diagram of a prior art digital pre-distortion (DPD) implementation for a single power amplifier (246), wherein DPD functionality is implemented via a feedback path (225) that operates on a sampled RF signal (250') output by the amplifier (246) and a digital processing block (220). As can be seen in FIG. 2, a coupler (250) may be used to provide the sampled RF signal (250') to the feedback path (225) and fed to an analog to digital block prior to processing by the digital processing block (220). In turn, the digital processing block (220) processes the digitized sampled RF signal (250") according to well known in the art DPD algorithms to generate a pre-distortion component that when added to an input signal (215a) generates a pre-distorted signal (215a'). When the pre-distorted signal (215a') is processed by the analog RF path that includes a mixer (235) for up conversion and the (non-linear) amplifier (246), the pre-distortion component of the pre-distorted signal (215a') complements the non-linear response of the amplifier (246) for an effective output RF signal of the amplifier (246) that is substantially free of non-linearities. In other words, the pre-distortion compensates for non-linearities of the amplifier (246).

With further reference to the prior art DPD implementation shown in FIG. 2, it would be clear to a person skilled in the art that such implementation may be extended to the prior art transceiver system shown in FIG. 1B by replicating the feedback path (225) and functionality of the digital processing block (220) for each amplifier (e.g., 146a of FIG. 1C) of a plurality of switchable transmit and receive paths of the transceiver. Some description of such implementation is provided in the related reference [2] which is incorporated herein by reference in its entirety. On the other hand, the related reference [1] which is incorporated herein by reference in its entirety, describes an implementation wherein the (single-input single-output, SISO) DPD model shown in FIG. 2 can be used as a SISO DPD model that operates on a combined over-the-air signal emitted from an antenna array (e.g., 160) that is coupled to the transceiver. However, a person skilled in the art would clearly understand that such implementations described in the related references [1] and [2] are impractical for a production system, due for example to the large amount of extra feedback paths required in one implementation and the over the air detector and related positioning mechanism required in the other. As will be later described, teachings according to the present disclosure allow implementation of a simple SISO DPD model (e.g. per FIG. 2) without the need of an over-the-air detector and without the need of (complicated) extra feedback paths.

Figure 3:
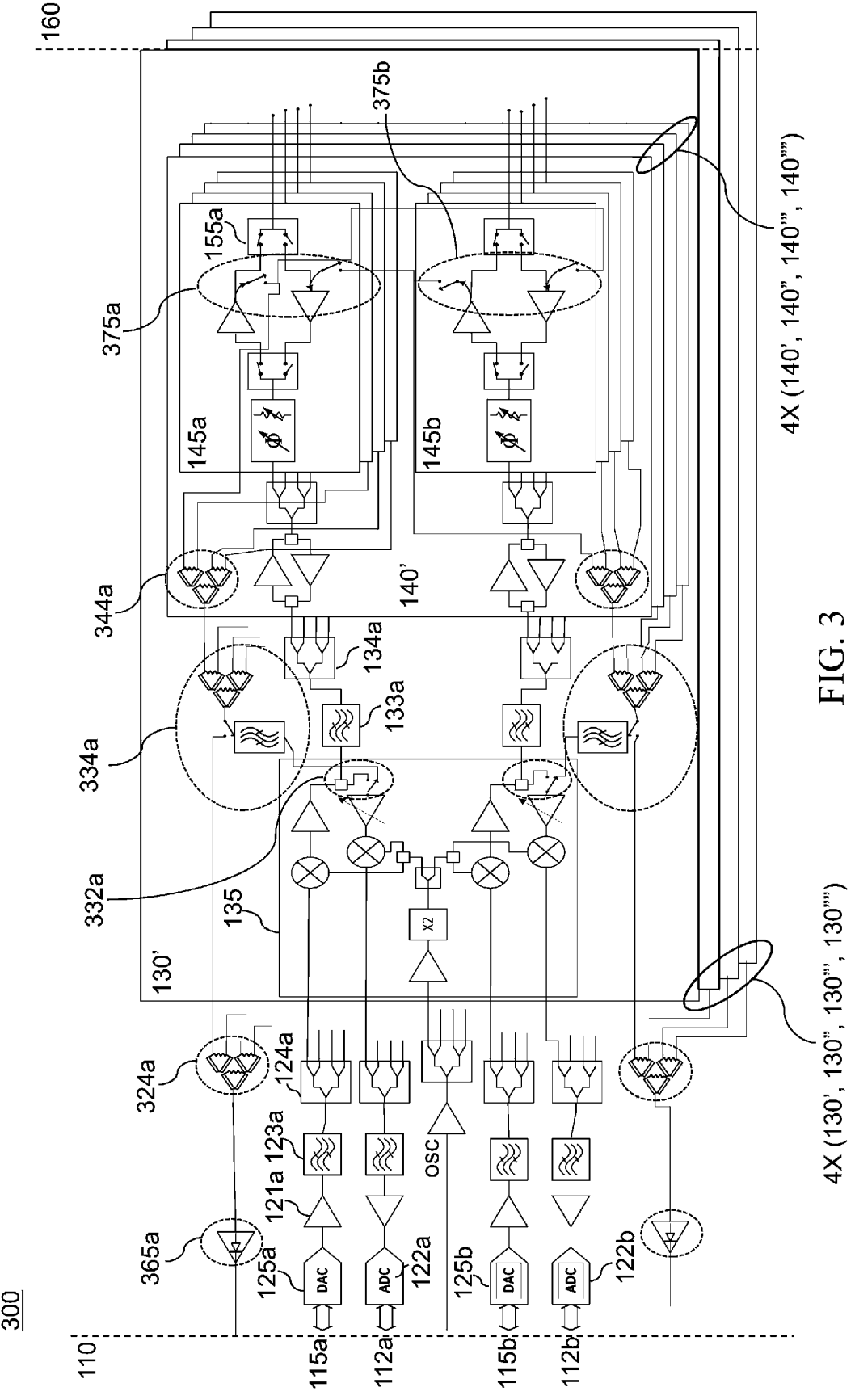
FIG. 3 shows a simplified schematic representation of an exemplary circuit implementation of a transceiver system according to an embodiment of the present disclosure comprising a plurality of switchable feedback paths coupled to switchable transmit and receive processing paths of the transceiver system.

FIG. 3 shows a simplified schematic representation of an exemplary circuit implementation of a transceiver system (300) according to an embodiment of the present disclosure comprising a plurality of switchable feedback paths (e.g., comprising elements 324a, 332a, 334a, 344a, 375a) coupled to switchable transmit and receive RF processing paths (145a, 145b) of the transceiver system (300). A person skilled in the art would clearly recognize that the transceiver system (300) includes basic elements of the transmit and receive RF processing paths (145a, 145b) of the exemplary prior art transceiver system described above with reference to FIGS. 1A, 1B and 1C to which elements (324a, 332a, 334a, 375a) for implementation of the switchable feedback paths are added. In turn, such switchable feedback paths are selectively coupled to an output of an amplifier (e.g., power amplifier) or input of an amplifier (e.g., LNA) of each of the switchable transmit and receive RF processing paths (145a, 145b). It should be noted that such switchable feedback paths according to the present teachings may be implemented in any prior art transceiver system configuration operating according to a TDD mode of operation beyond the exemplary configuration of FIG. 1A.

With continued reference to FIG. 3, the switchable feedback paths may include a combination of one or more switches or switching elements (e.g., 332a, 334a, 375a), filters (e.g., within 334a), and power combiners (e.g., 324a, 344a, and within 334a). As used herein, a switching element may refer to an element comprising at least one switch that is configured to selectively provide at least two different/separate conduction paths. In combination with the basic elements of the transmit and receive processing paths (145a, 145b), such switches, filters and power combiners define the switchable feedback paths according to the present disclosure that may be used to selectively feed information about a phase and amplitude of a signal being processed in a receive or transmit path of the transceiver system (300) for further processing. The switchable feedback paths according to the present teachings may use parts/segments of the transmit and receive processing paths (145a, 145b). In other words, the switchable feedback paths may share segments of conduction paths of the transmit and receive processing paths (145a, 145b).

With continued reference to FIG. 3, according to some exemplary embodiments, sharing of the conduction paths of a transmit and receive processing path (145a, 145b) may be performed while said processing path is active, such as, for example, sharing of a segment of a transmit path and/or a receive path during an active transmit phase of the processing path. According to further exemplary embodiments, sharing of the conduction paths may be performed while the transmit and receive processing path (145a, 145b) is not active, such as, for example, sharing (e.g., reusing) of a segment of a transmit path and/or a receive path of said processing path for a task other than transmit or receive via the antenna array. As used herein, the term "active" with reference to a transmit and receive processing path (145a, 145b) may refer to a condition wherein the said processing path receives and/or transmits an RF signal via elements of the antenna array. Accordingly, the transmit and receive processing path (145a, 145b) may be active during an active transmit phase wherein an RF signal is transmitted via an element of the antenna array, and/or during an active receive phase wherein an RF signal is received via an element of the antenna array.

With continued reference to FIG. 3, according to some exemplary embodiments of the present disclosure, information through the feedback paths may be provided to a signal aware controller, such as, for example, to the digital processing block (110) which in turn can use the information for various tasks. According to some exemplary embodiments of the present disclosure, the various tasks may include phase and/or amplitude calibration of one or more transmit paths of the transceiver system (300), phase and/or amplitude calibration of one or more receive paths of the transceiver system (300), and/or linearization of one or more of the transmit paths of the transceiver system (300).

With continued reference to FIG. 3, according to some exemplary embodiments of the present disclosure, phase and amplitude calibration of a transmit or receive path may be based on an RF signal provided by the switchable feedback path and adjusted via the phase and amplitude adjustment blocks (e.g., 148a of FIG. 1C) of the (switchable) transmit and receive RF processing path (e.g., 145a). According to some exemplary embodiments of the present disclosure, the phase and amplitude adjustment block (e.g., 148a) of the transmit and receive RF processing path (e.g., 145a) may be adjusted for a transmit path and a receive path of said processing path independently from one another.

With continued reference to FIG. 3, according to some exemplary embodiment of the present disclosure, the phase and amplitude calibration may be based on equalization of phase and amplitude across all the transmit and receive processing paths (145a, 145b). In other words, the processing paths may be calibrated (via settings of the blocks 148a, 148b) to reduce phase and amplitude imbalances among the paths so to provide a substantially same amplitude and phase responsive to a same RF signal conducted through the paths.

According to an embodiment of the present disclosure, an interferometric procedure may be used for phase and amplitude calibration of the paths wherein RF signals through the paths may be combined (e.g., via power combiners) and phase/amplitude adjustments may be performed in view of detected/monitored minima/maxima of a combined RF signal. In particular, as later described with reference to FIGS. 7A-7C, phase adjustment may be performed to obtain a null of an amplitude of the combined RF signal, and amplitude adjustment may be performed to obtain a minimum value of the null. According to further exemplary embodiments of the present disclosure, as later described with reference to FIGS. 8A-8C, the minima/maxima of the combined RF signal may be detected/monitored via an envelope detection circuit (e.g., 365a) which is known per se, or via any other suitable analog/digital circuit.

With continued reference to FIG. 3, according to some exemplary embodiments of the present disclosure, the phase and amplitude calibration may include cross calibration between the two different polarizations as later described with reference to FIG. 9. For example, a calibrated transmit path of one polarization can be used to calibrate the receive paths of the other polarization. Such cross calibration may be possible due to a degree of isolation inherently required between conduction paths of the two polarizations of the transceiver system (300), which in turn allows for a reduced cross coupling of an RF signal through a transmit path of one polarization that may be used to calibrate a receive path of the other polarization.

With continued reference to FIG. 3, according to some exemplary embodiments of the present disclosure, the phase and amplitude calibration may be performed via small signal amplitude condition of the RF paths, in other words, in view of conducted RF signals that have a low amplitude so to not saturate amplifiers in the RF paths (which can generate nonlinearities that may render calibration inaccurate). Small signal amplitudes may be provided via test signals generated specifically for the calibration during a non-active phase of the RF paths. Alternatively, or additionally, calibration may be performed during an active transmit phase in view of portions of a transmitted RF signal with a small signal amplitude, such as, for example, during a preamble and/or various synchronization frames. A signal aware controller, such as the digital processing block (110), may control start/stop of the calibration.

With continued reference to FIG. 3, according to some exemplary embodiments of the present disclosure, as later described with reference to FIGS. 10A-10B, linearization of one or more transmit paths of the transceiver system (300) may be based on a combined RF signal from the one or more (active) transmit paths that is fed back, via the switchable feedback paths, as a receive data signal (e.g., 112a, 112b) to the digital processing block (110). Accordingly, (single-input, single-output, SISO) DPD algorithms embedded within, or available through, the digital processing block (110), may derive pre-distortion components to generate a pre-distorted transmit data signal (e.g., 115a, 115b). A person skilled in the art would appreciate flexibility and compactness of such approach for linearizing either a single transmit path or a plurality of transmit paths using a known in the art SISO techniques. As linearity may typically change according to a response time that is much slower compared to a frame rate of transmitted data, linearization may be performed in a piecewise fashion, wherein different combined RF signals corresponding to different distinct groups of the transmit paths are each linearized at different time slices. According to some embodiments of the present disclosure, such groups may correspond to groups of one or more individual columns or rows of elements of the antenna array (160) used for steering of elevation and/or azimuth of an emitted signal.

With continued reference to FIG. 3, a switchable feedback path according to the present disclosure may include a power combiner (344a) that is selectively coupled, via a switching element (375a) of the switchable feedback path, to transmit paths of the (switchable) transmit and receive RF processing paths (145a). In the exemplary configuration shown in FIG. 3, the power combiner (344a) can be selectively coupled to each of the four transmit and receive RF processing paths (145a) of the RF processing sub-circuit (140'). As described earlier and shown in FIG. 3, similar feedback paths are provided for each of the two polarizations, although description in the present disclosure is mainly provided with reference to one of the polarizations. Furthermore, it should be noted that the switchable feedback path according to the present disclosure extends across all the transmit and receive paths of the transceiver system configuration shown in FIG. 3. In other words, with exemplary reference to elements (375a) and (344a), similar elements (375a) and (344a) and respective connections are provided with respect to each of the processing paths (145a) and each of the RF processing sub-circuits (140', 140", 140''', 140'''').

Figure 6A:
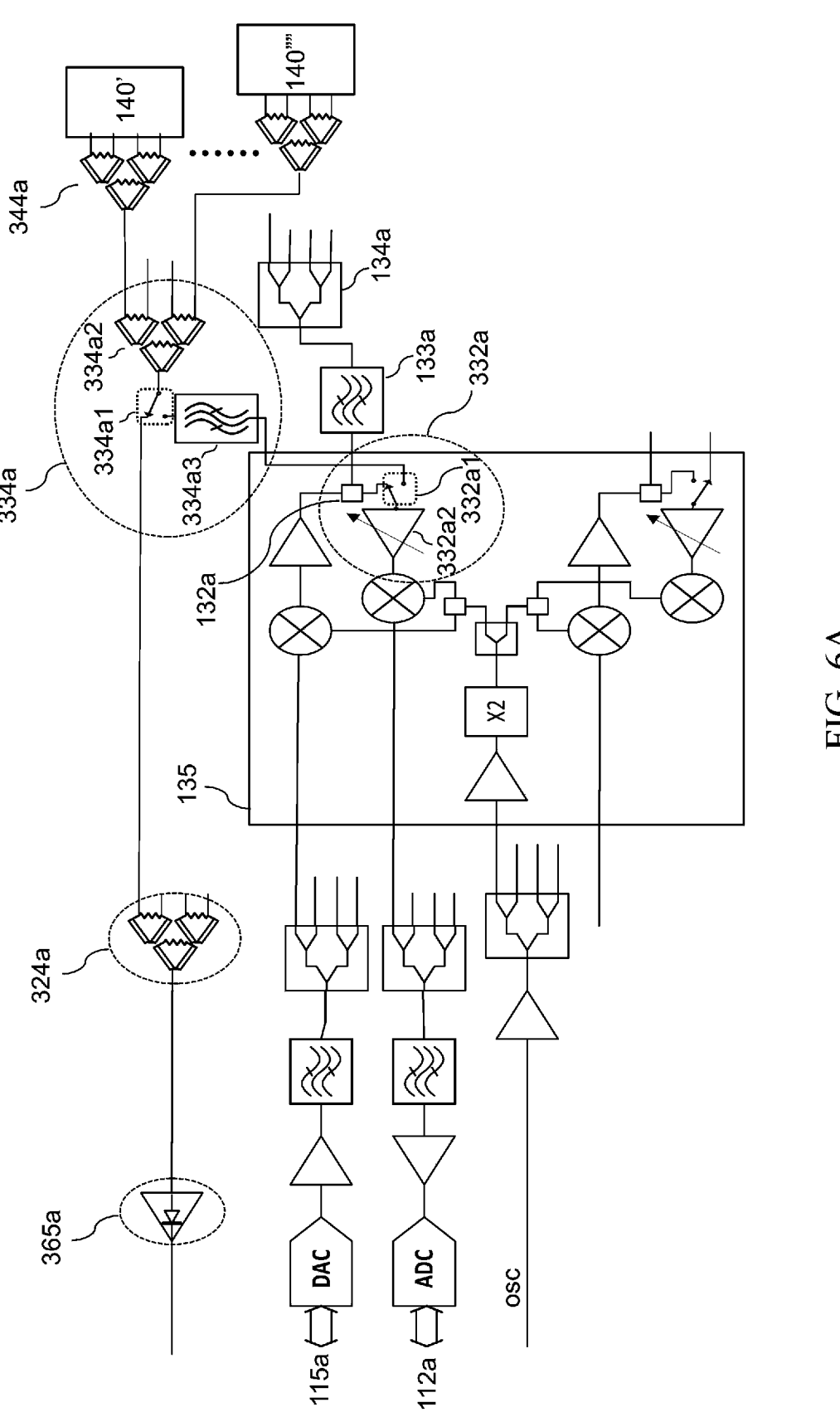
FIG. 6A shows elements of the switchable feedback paths configured to couple a combined feedback of the plurality of switchable feedback paths to an envelope detector.
Figure 6B:
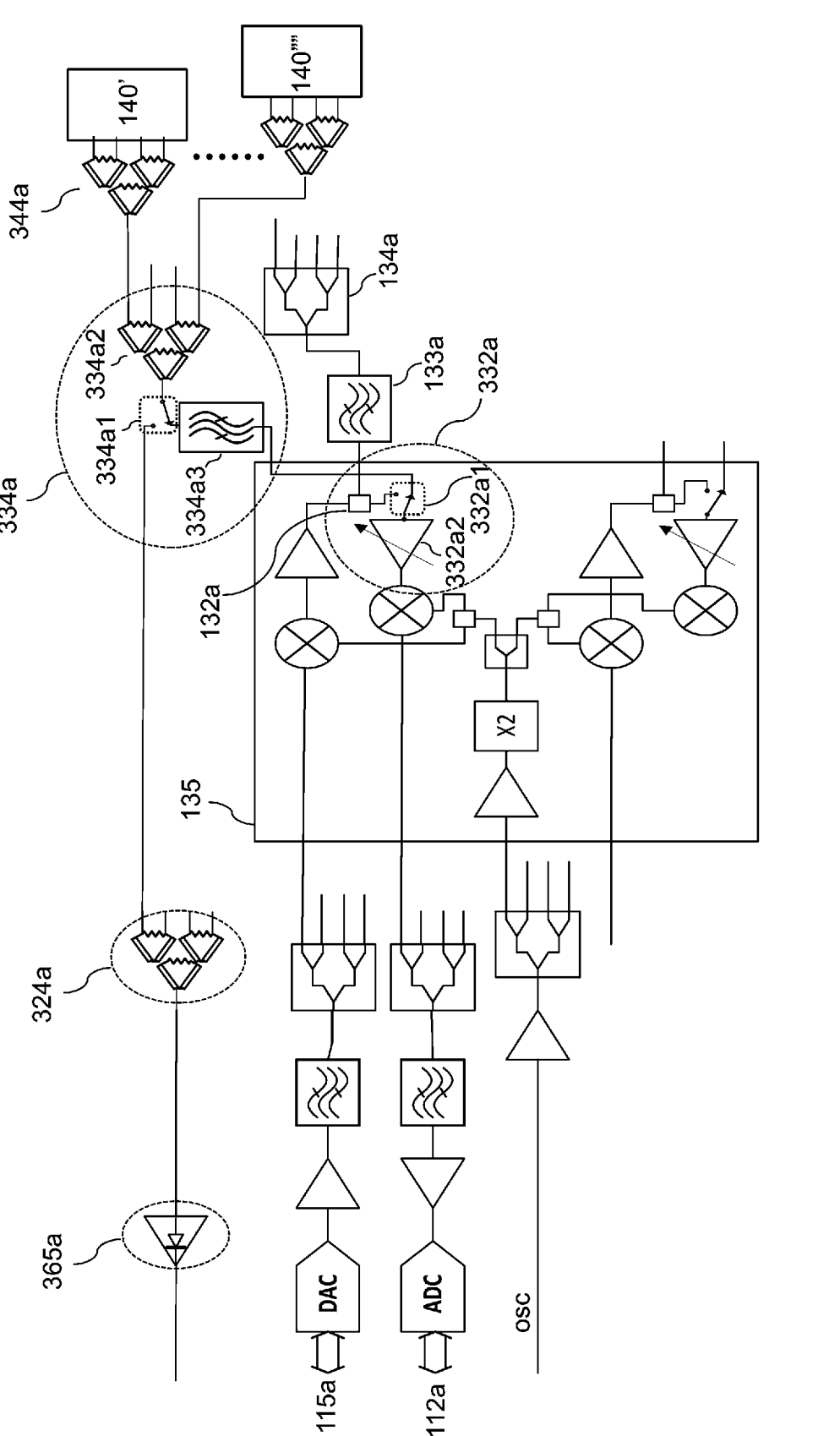
FIG. 6B shows elements of the switchable feedback paths configured to couple a combined feedback of the plurality of switchable feedback paths to a receive data channel of a digital processing block.

With continued reference to FIG. 3, the switchable feedback path according to the present disclosure may further include a switching element (334a), with further details shown in FIGS. 6A-6B, which includes a power combiner (e.g., 334a2 of FIG. 6A) that is coupled to the power combiner(s) (344a) and a switch (e.g., 334a1 of FIG. 6A) to selectively route a combined RF signal to the dual polarization mixer (135) through a (bandpass) filter (e.g., 334a3 of FIG. 6A) or to another power combiner (324a) that is coupled to the envelope detection circuit (365a). Accordingly, the switching element (334a) allows selective feedback of a combined RF signal through one or more transmit paths to be down converted via the dual polarization mixer (135) and used as a receive data signal (112a) by the digital processing block (110), or to be potentially further combined with RF signals of other transmit paths (e.g., contained in 130", 130''', 130'''') prior to being fed to the envelope detection circuit (365a). It should be noted that as can be clearly seen in FIG. 3, with further details in FIGS. 6A-6B, the switchable feedback path according to the present disclosure may further include a switching element (332a) which may selectively couple an input of the dual polarization mixer (135) to element (133a) for normal operation (e.g., reception from antenna array 160) or to the switching element (334a) for operation according to a feedback mode. Furthermore, it should be noted that, as is well known in the art, the dual polarization mixer (135) may be formed by two separate mixers for respective up conversion and down conversion, wherein the mixers may share a same oscillator (e.g., local oscillator). Furthermore, each of the two separate mixers may further include two mixers, one for each of the two polarizations.

With reference back to the switching element (375a), as can be seen in FIG. 3, such element, in combination with its dual switching element (375b) of the other polarization, may be used to selectively couple a transmit or receive path of a transmit and receive processing path (e.g., 145a) of one polarization to a receive or transmit path of a transmit and receive processing path (e.g., 145b) of the other polarization. As described later with respect to FIG. 9, such configuration can allow cross calibration between the two different polarizations, such as, for example, using of a calibrated transmit path of one polarization to calibrate a receive path of the other polarization. As used herein, a dual element of an element of a transmit and receive path of a first polarization that is coupled to an element (e.g., 160mn, 160kp of FIG. 1C) of the antenna array (160) refers to an element of a same function that is part of a transmit and receive path of the other polarization that is coupled to a same element of the antenna array (160). Accordingly, it would be clear to a person skilled in the art that any element part of one transmit and receive path of the transceiver shown in FIG. 3 may include a dual element.

With continued reference to FIG. 3, switching elements (332a, 334a, 375a, 375b) in combination with basic switching elements (e.g., 149a, 155a, 122a of FIG. 1C) of the transceiver system (300) may be used to configure the switchable feedback paths. In other words, a conduction path provided by a switchable feedback path according to the present disclosure may be based on a configuration of the switching elements (332a, 334a, 375a, 375b) in combination with basic switching elements (e.g., 149a, 155a, 122a of FIG. 1C) of the transceiver system (300). As described later, such switching elements may configure the transceiver system (300) in its entirety, or partially based on fewer than the totality of transmit/receive paths, to operate according to at least four modes of operation, including: a) normal transmit or receive, b) transmit paths phase and amplitude calibration, c) receive paths phase and amplitude calibration, and d) transmit with DPD feedback for linearization. According to some embodiments of the present disclosure, some such modes of operation may coexist. For example, a) and b) may coexist during a transmit phase, a) and c) may coexist during a transmit phase, and a) and d) may coexist during a transmit phase.

Figure 4A:
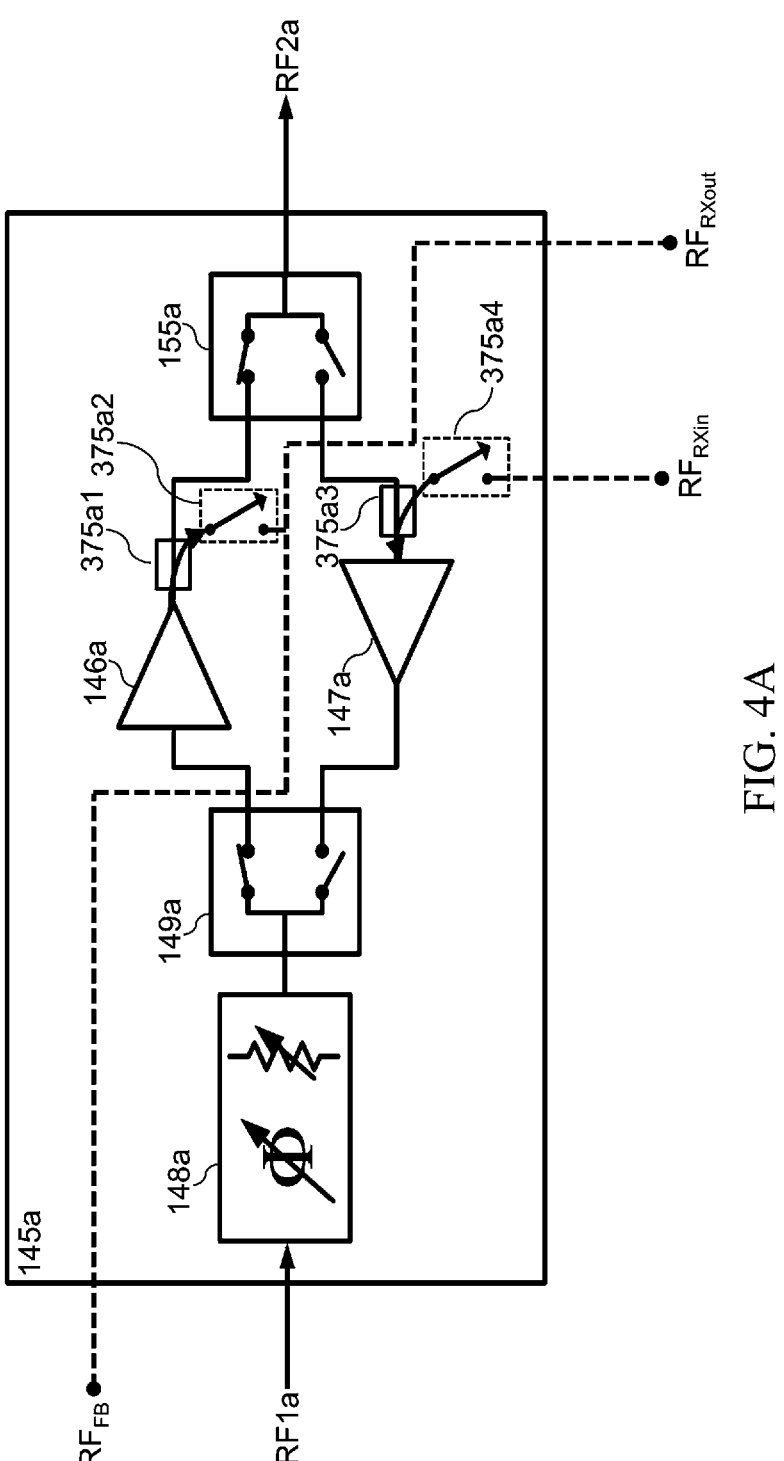
FIG. 4A shows details according to an embodiment of the present disclosure of elements of a switchable feedback path coupled to a power amplifier (PA) and a low noise amplifier (LNA) of a switchable transmit and receive processing path of the transceiver system.

FIG. 4A shows details according to an embodiment of the present disclosure of elements (375a1, 375a2, 375a3, 375a4) comprised in the element (375a) of the switchable transmit and receive processing path (145a) of FIG. 3. As can be seen in FIG. 4A, such elements include a power coupler (375a1) coupled to an output of the amplifier (PA, 146a) and configured to couple a small, such as for example in a range of −20 dB to −30 dB) portion of a power of an RF signal, RF2a, output by the amplifier (146a) to a common (pole) terminal of a switch (375a2). Similarly, a power combiner (375a3) coupled to an input of the amplifier (LNA, 147a) is configured to selectively couple and decouple the input of the amplifier (147a) to/from an RF signal, $RF_{RXin}$, via a switch (375a4), and to/from an RF signal, RF2a, received through the switch (155a). It should be noted that positions of switches (149a, 155a, 375a2, 375a4) as depicted in FIG. 4A correspond to operation of the switchable transmit and receive processing path (145a) during a (normal) transmit phase, wherein switch (149a) conducts the incoming RF1a signal that is phase and amplitude adjusted via (148a) to the amplifier (146a), and the switch (155a) conducts an amplified version, RF2a, of the incoming phase and amplitude adjusted signal for transmission via an element of the antenna array (160).

With continued reference to FIG. 4A, a person skilled in the art would clearly understand that in some cases, it may be desirable to terminate signal paths that are left opened by unused throws of the switches (e.g., 375a2, 375a4, 155a). For example, in the shown position in FIG. 4A, the switch (375a2) presents an open circuit to the power coupler (375a1) that is coupled to the output of the amplifier (146a), and the switch (155a) presents an open circuit to the power coupler (375a3) that is coupled to the input of the amplifier (LNA, 147a). Such open circuits may in turn cause undesired signal reflection in the switchable transmit and receive processing path (145a) during operation of the path (e.g., per anyone of the configurations shown in the various figures of the present application). It follows that according to some exemplary embodiments of the present disclosure, the open/unused throws (associated to poles/switching terminals of the switches as shown in FIGS. 4E1-4E2) of the switches may be terminated via proper termination impedances (e.g., resistors), or even terminated via circuits coupled to poles (e.g., switching terminals) of the switches that may be used, for example, to monitor power through the path (145a) during operation in transmit or receive modes. This is shown in FIG. 4E1 and FIG. 4E2, respectively corresponding to the switches (375a2, 375a4) and (155a), wherein the unused poles (i.e., switching terminals that selectively connect to the common pole/terminal of the switch) of the switches (P0) are shown coupled to respective impedances (Z, Z1, Z2) that may be coupled via respective nodes (N, N1, N2)

to a reference ground (for termination) or to a power monitoring circuit (e.g., a power detector).

Figure 4B:
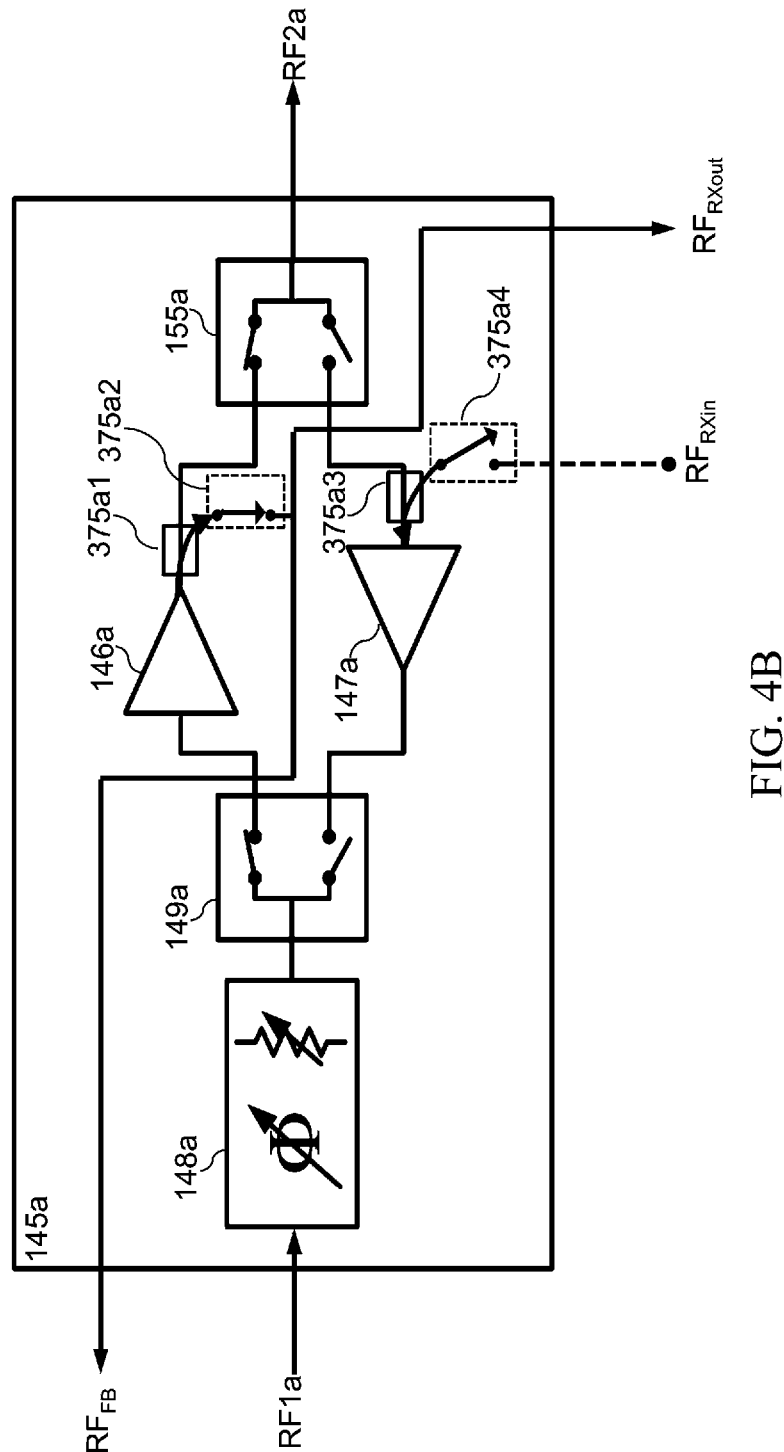
FIG. 4B shows the switchable transmit and receive processing path of FIG. 4A configured to provide a portion of a transmitted signal to a switchable feedback path, the switchable feedback path independent from a receive path of the switchable transmit and receive processing path.

FIG. 4B shows the switchable transmit and receive processing path (145a) of FIG. 4A configured to provide a portion (e.g., in a range of −20 dB to −30 dB) of the transmitted signal (RF2a) to a switchable feedback path, the switchable feedback path independent from a receive path of the switchable transmit and receive processing path (145a). As can be seen in FIG. 4B, the feedback path is created by closing the switch (375a2) so to couple the portion of the RF2a signal as a feedback RF signal, $RF_{FB}$, to the feedback path. It should be noted that the signal $RF_{FB}$ is the same as signal $RF_{RXOUT}$ since they both come from the same node of the switch (375a2). They are given different names to indicate their intended routing. As can be taken from FIG. 4B, the feedback path may be established (i.e., switched in) while the (output) switch (155a) is configured for transmission. It should be noted that the feedback path shown in FIG. 4B may also be established while the switch (155a) decouples the output of the amplifier (146a) from the antenna array in which case the incoming RF1a signal may be, for example, a calibration test signal.

Figure 4C:
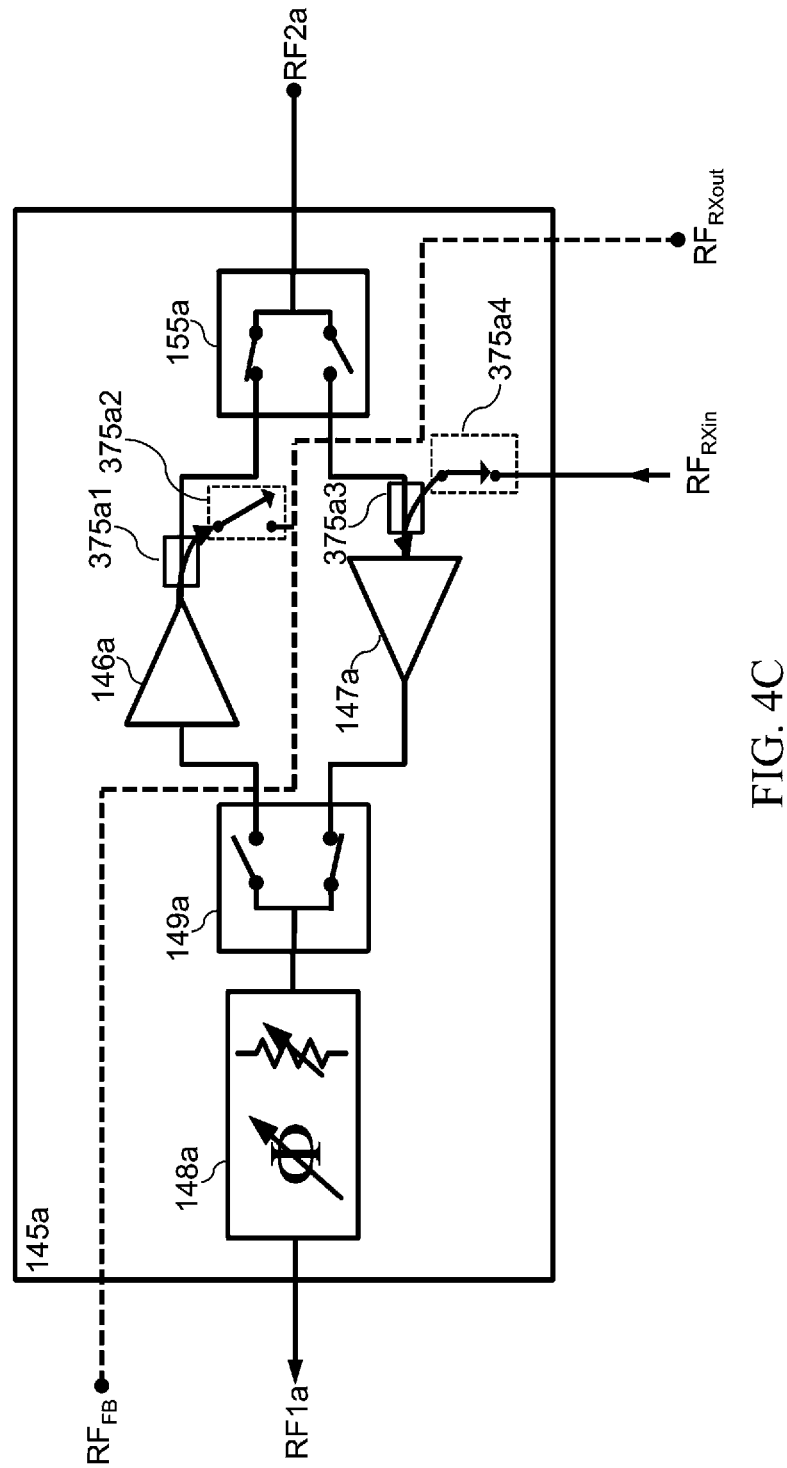
FIG. 4C shows the switchable transmit and receive processing path of FIG. 4A configured to provide a test signal to a switchable feedback path, the switchable feedback path based on a receive path of the switchable transmit and receive processing path.

FIG. 4C shows the switchable transmit and receive processing path (145a) of FIG. 4A configured to provide a test signal, $RF_{RXin}$, to a switchable feedback path, the switchable feedback path based on a receive path of the switchable transmit and receive processing path (145a). As can be seen in FIG. 4C, the feedback path is created by closing the switch (375a4) so to couple the signal $RF_{RXin}$ to the input of the LNA (147a). It should be noted that the switch (155a) as shown in FIG. 4C presents an open (i.e. high impedance) with respect to the input of the LNA (147a) and therefore may have an adverse effect on the input of the LNA (147a) as described above with reference to FIG. 4A, which may be overcome by using the switch configuration described above with reference to FIG. 4E2. As can be seen in FIG. 4C, switch (149a) is configured to conduct an amplified version of the $RF_{RXin}$ signal for phase and amplitude adjustment through the phase and amplitude adjustment block (148a), which can be processed further down the receive path shown in FIG. 3. It should be noted that the feedback path shown in FIG. 4C may be established while the switch (155a) couples the output of the amplifier (146a) to the antenna array as shown in FIG. 4A, or while the switch (155a) decouples the output of the amplifier (146a) from the antenna ray. In other words, position of the switch (155a) with respect to the output of the amplifier (146a) may not affect operation of the feedback path shown in FIG. 4C. This is due to the position of the switch (149a) which decouples the amplifier (146a) from a shared transmit and receive segment of the switchable transmit and receive processing path (145a) that includes element (148a).

Figure 4D:
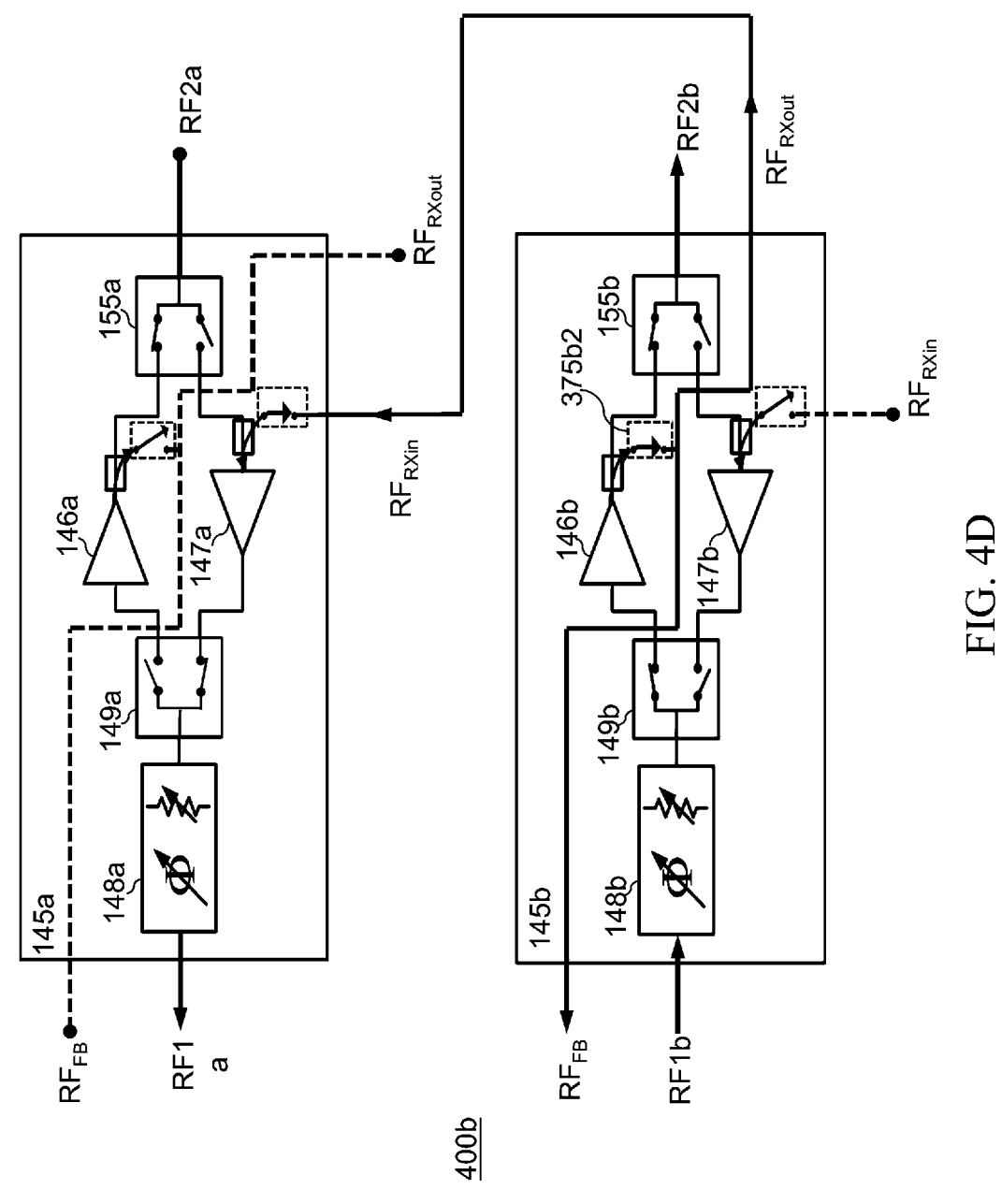
FIG. 4D shows two switchable transmit and receive processing paths coupled according to an embodiment of the present disclosure, one configured according to the configuration of FIG. 4B to feedback a portion of a transmitted signal, and the other configured according to the configuration of FIG. 4C to receive the portion of the transmitted signal as a test signal.

FIG. 4D shows two switchable transmit and receive processing paths (145a, 145b) coupled according to an embodiment of the present disclosure, wherein the processing path (145b) is configured according to the configuration of FIG. 4B to feedback a portion of a transmitted signal, $RF_{RXout}$, and the other processing path (145a) is configured according to the configuration of FIG. 4C to receive the portion of the transmitted signal $RF_{RXout}$ as a test signal. As later described with reference to FIG. 9, such configuration can be used to, for example, calibrate a receive path through the processing path (145a) via a calibrated transmit path through the processing path (145b).

Figure 5:
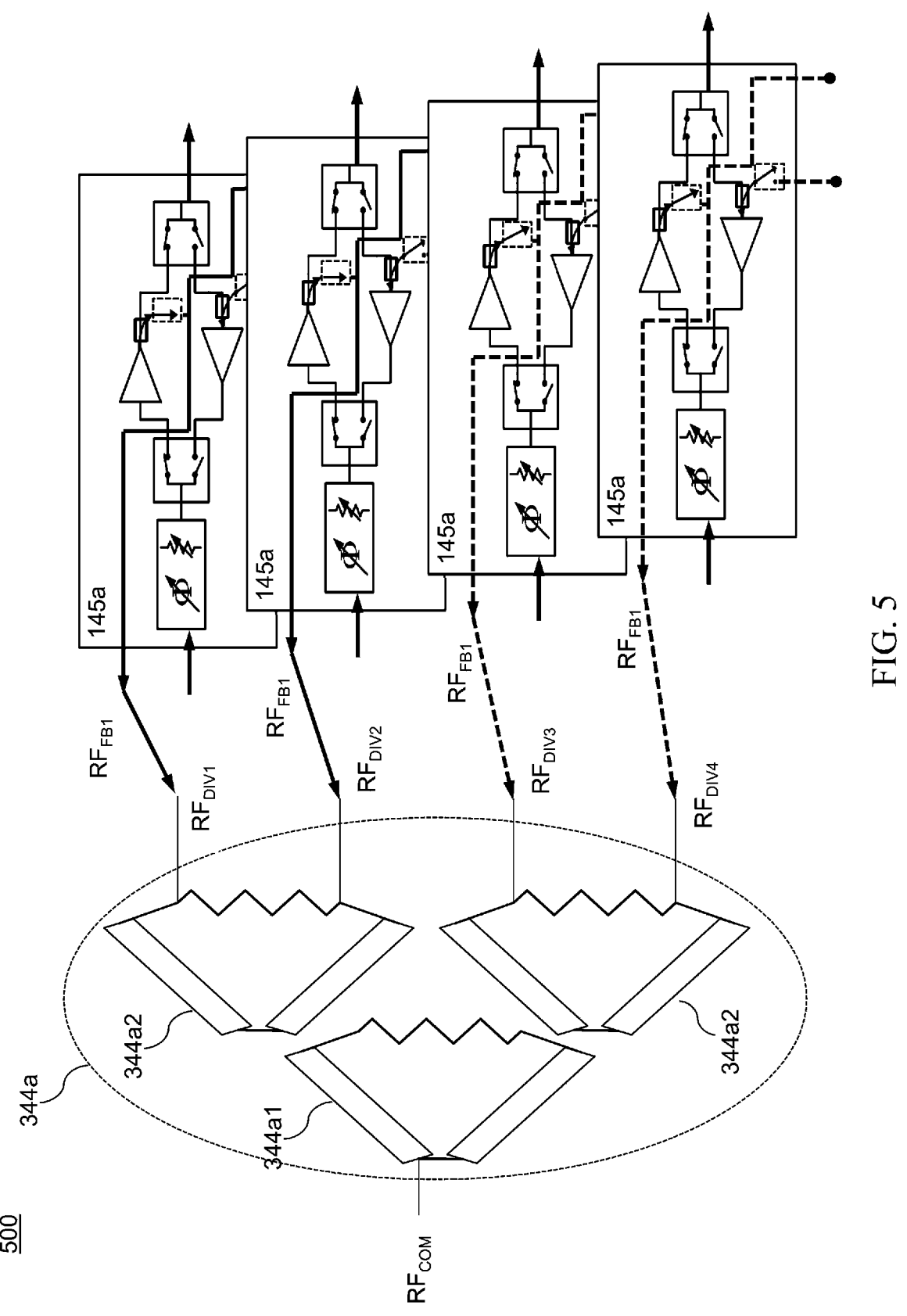
FIG. 5 shows a configuration according to an embodiment of the present disclosure of a power combiner for combining feedback from the plurality of switchable feedback paths.

FIG. 5 shows a configuration according to an embodiment of the present disclosure of the power combiner/divider (344a), also referred to herein as RF combiner, RF divider, power combiner or power divider, shown in FIG. 3 that is used to combine feedback from a plurality of switchable feedback paths coupled to a plurality of switchable transmit and receive processing paths (145*a*). According to an exemplary embodiment of the present disclosure, the power combiner/divider (344*a*) may include a plurality of quarter wavelength transmission lines (344*a*1, 344*a*2) that are combined according to a tree structure as shown in the figure. A well known in the art power combiner/divider is of a Wilkinson type, description of which is outside the scope of the present disclosure.

As can be seen in FIG. 5, feedback paths from each of the switchable transmit and receive processing paths (145*a*) are coupled to respective nodes ($RF_{DIV1}, \ldots, RF_{DIV4}$) of the power combiner/divider (344*a*) to produce a combined RF signal (based on switched in/out state of the feedback paths) at node $RF_{COM}$ of the power combiner/divider (344*a*). In the exemplary configuration depicted in FIG. 5, switchable feedback paths coupled to nodes ($RF_{DIV1}$, $RF_{DIV2}$) are switched in to provide a feedback RF signals ($RF_{FB1}$, $RF_{FB2}$), whereas switchable feedback paths coupled to nodes ($RF_{DIV3}$, $RF_{DIV4}$) are switched out and therefore do not contribute to the combined RF signal at the node $RF_{COM}$. As previously noted, a power combiner may be provided by other means that one showed in FIG. 5, including, for example, via a combination of one or more switches, couplers and series or parallel impedances according to well known in the art design techniques.

FIG. 6A shows elements of the switchable feedback paths of FIG. 3 configured to couple the combined feedback of the plurality of switchable feedback paths (e.g., per FIG. 5) to the envelope detector (365*a*). As can be seen in FIG. 6A, the switching element (334*a*) includes a switch (334*a*1) which can selectively enable a feedback path from a combination of elements (344*a*) to a) the envelope detector (365*a*) through the power combiner (324*a*), or b) to the dual polarization mixer (135) through the bandpass filter (334*a*3). FIG. 6A shows the switch (334*a*1) configured for enabling the feedback back to the envelope detector (365*a*), and FIG. 6B shows the switch (334*a*1) configured for enabling the feedback back to the dual polarization mixer (135).

With continued reference to FIG. 6A, according to an embodiment of the present disclosure, the switching element (332*a*) comprises a switch (332*a*1) which can selectively enable coupling of an input amplifier/buffer (332*a*2) of the dual polarization mixer (135) to the feedback path (through switching element (334*a*)) or to the switch (132*a*) as part of normal operation of the transceiver (e.g., switchable feedback path not enabled). In other words, as can be clearly taken from FIG. 6A, the switch (332*a*1) allows bypassing a configuration of the dual polarization mixer (135) for normal processing of a transmit or receive RF signal, to instead receive a (combined) feedback RF signal through the switching element (334*a*). Because the feedback RF signal may have an amplitude (i.e., power) greater than a receive RF signal during normal operation, according to an embodiment of the present disclosure the input amplifier/buffer (332*a*2) may comprise a variable gain/attenuation so to not overload a processing circuit of the dual polarization mixer (135) when coupled to the switchable feedback path.

Figures 7A, 7B:
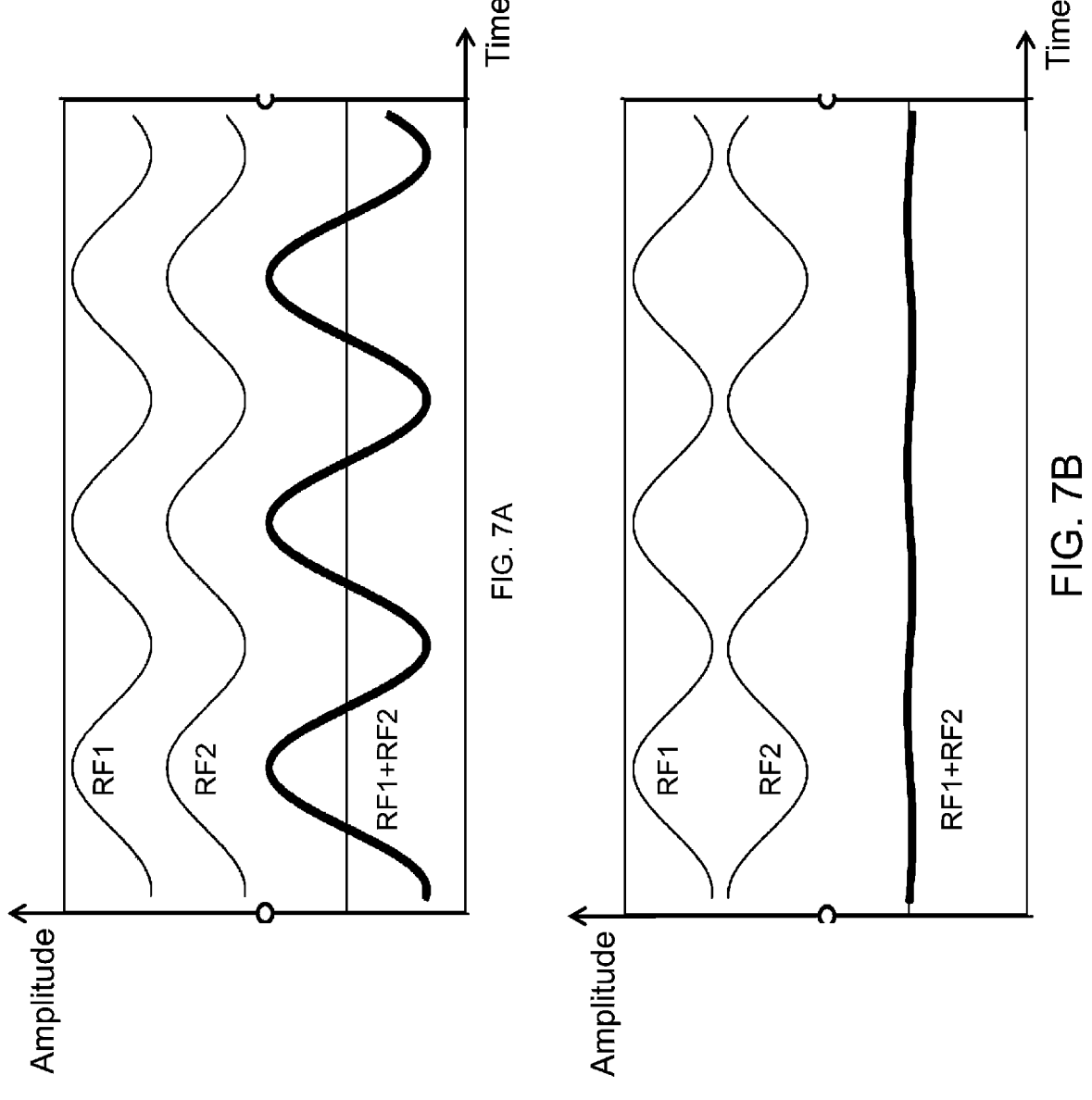
FIG. 7A and FIG. 7B show exemplary graphs respectively representing a sum of two RF signals of same phase and of opposite phase.

FIG. 7A and FIG. 7B show exemplary graphs respectively representing a sum of two RF signals of same phases and of opposite phases. A person skilled in the art would clearly realize that as shown in the figures, considering two RF signals, RF1 and RF2 having a same frequency content, a sum of the two RF signals is at a maximum when the two RF signals are in phase (i.e., phase difference equal to +/−k\*360 degrees per FIG. 7A), and the sum is at a minimum (or a null) when the two RF signals are out of phase (i.e., phase difference equal to +/−k\*360+180 degrees per FIG. 7B). According to some embodiments of the present disclosure, phase calibration of the transmit paths and of the receive paths of the transceiver system (300) of FIG. 3 can be provided by nulling the sum of RF signals through two paths, one of the two paths being considered as a reference path and the other as the target path to be calibrated. Nulling can be performed via adjusting of the phase of the RF signal through the target path via a corresponding phase and amplitude adjustment block (e.g., 148*a* of FIG. 4A), and monitoring/detection of the null can be provided via, for example, feeding of the sum of the two RF signals to the envelope detection circuit (e.g., 365*a* for calibration of transmit paths per FIGS. 8A-8C later described) or down converting (e.g., via the dual polarization mixer 135) the sum of the two RF signals and feeding a digitized version of it to the digital processing block (110) as a receive data signal (e.g., for calibration of receive paths per FIG. 9 later described). The sum of the two RF signals can be provided via combining of the two RF signals as described above with reference to, for example, FIGS. 4-6.

Figure 7C:
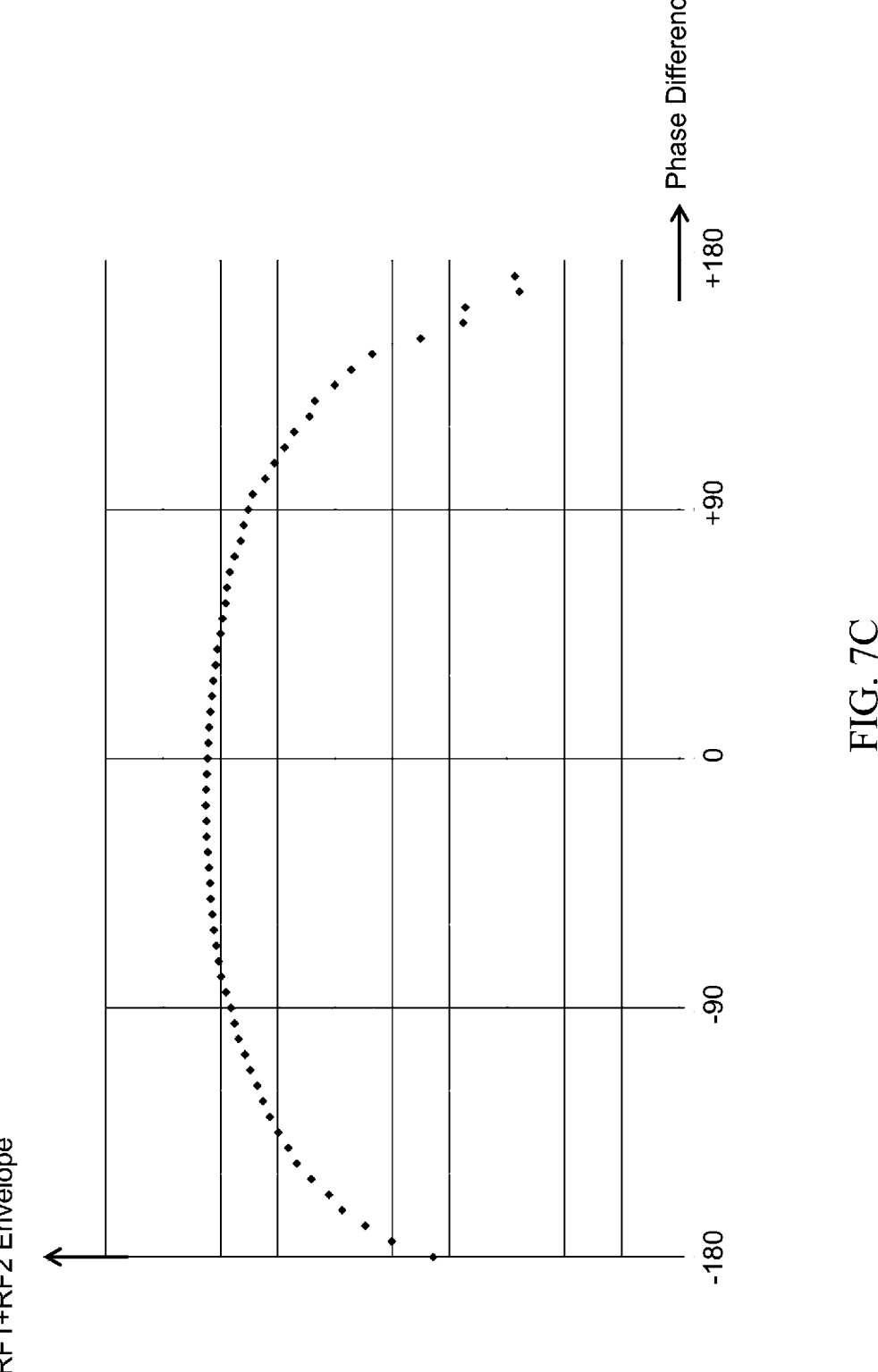
FIG. 7C shows an exemplary graph representing sensitivity of an envelope of a sum of two RF signals with respect to a phase difference of the two RF signals.

FIG. 7C shows an exemplary graph representing sensitivity of an envelope of a sum of the two RF signals of FIGS. 7A-7B with respect to a phase difference of the two RF signals. As can be seen in the figure, a slope of variation of the sum is substantially greater in a region where the two RF signals are out of phase (e.g., phase difference of +/−180 degrees) when compared to a region where the two RF signals are in phase (e.g., phase difference of 0 degrees). Accordingly, a more accurate position of a null, and therefore a reference 180 degrees phase difference, can be obtained as compared to a position of a maximum (i.e., 0 degrees phase difference). Once the null position, and therefore a corresponding null setting (e.g., control, control word, control bits, etc.) for the phase of the phase and amplitude adjustment block (e.g., 148*a*) of the path to be calibrated is established, calibration of the path with respect to the phase can be provided by adding 180 degrees to the null setting. It can be further verified that the addition of the 180 degrees results in a maximum of the (envelope of the) sum as the addition should bring the two signals in phase.

With reference back to FIG. 7A and FIG. 7B, a person skilled in the art would clearly understand that amplitude value of a detected null may be a function of a difference in amplitudes between the two RF signals, RF1 and RF2. In other words, although a null may be obtained via adjusting of the phase of the target signal to be calibrated, a level of the null may be dependent of the difference in amplitudes of RF1 and RF2. Accordingly, amplitude calibration of the transmit paths and of the receive paths of the transceiver system (300) of FIG. 3 can be provided by minimizing a null value detected through calibration of the phase, wherein the minimizing of the null value can be provided by adjusting the amplitude of the RF signal through the path to be calibrated via a corresponding phase and amplitude adjustment block (e.g., 148*a* of FIG. 4A). Accordingly, calibration of the phase and amplitude equalizes phase and amplitude through the target path and the reference path. Values of the phase and amplitude adjustment blocks (148*a*, 148*b*) may therefore be considered as offset values with respect to a reference value (e.g., of the reference path). Accordingly offset values (e.g., weights) for equalization between any two paths can be established. For example, if the offset (digital) values between a reference path and a first target path is (+3, −1) and if the offset value between the reference path and a second target paths is (−1, +2), then offset values between the first and the second target paths may be deduced as (−4, +3).

It should be noted that although an envelope detection circuit may be likened by a person skilled in the art to a specific design using a diode to rectify an incoming RF signal, teaching according to the present disclosure should not be limited to such specific design, as other circuits (combination of digital and/or analog) that can provide information on an envelop of the RF signal may be used as the element (365a). Such other circuits may not only be used as the element (365a) shown in FIG. 3, but also within the digital processing block (110) for calibration of the receive paths as described with reference to FIG. 9 later described.

Figure 8A:
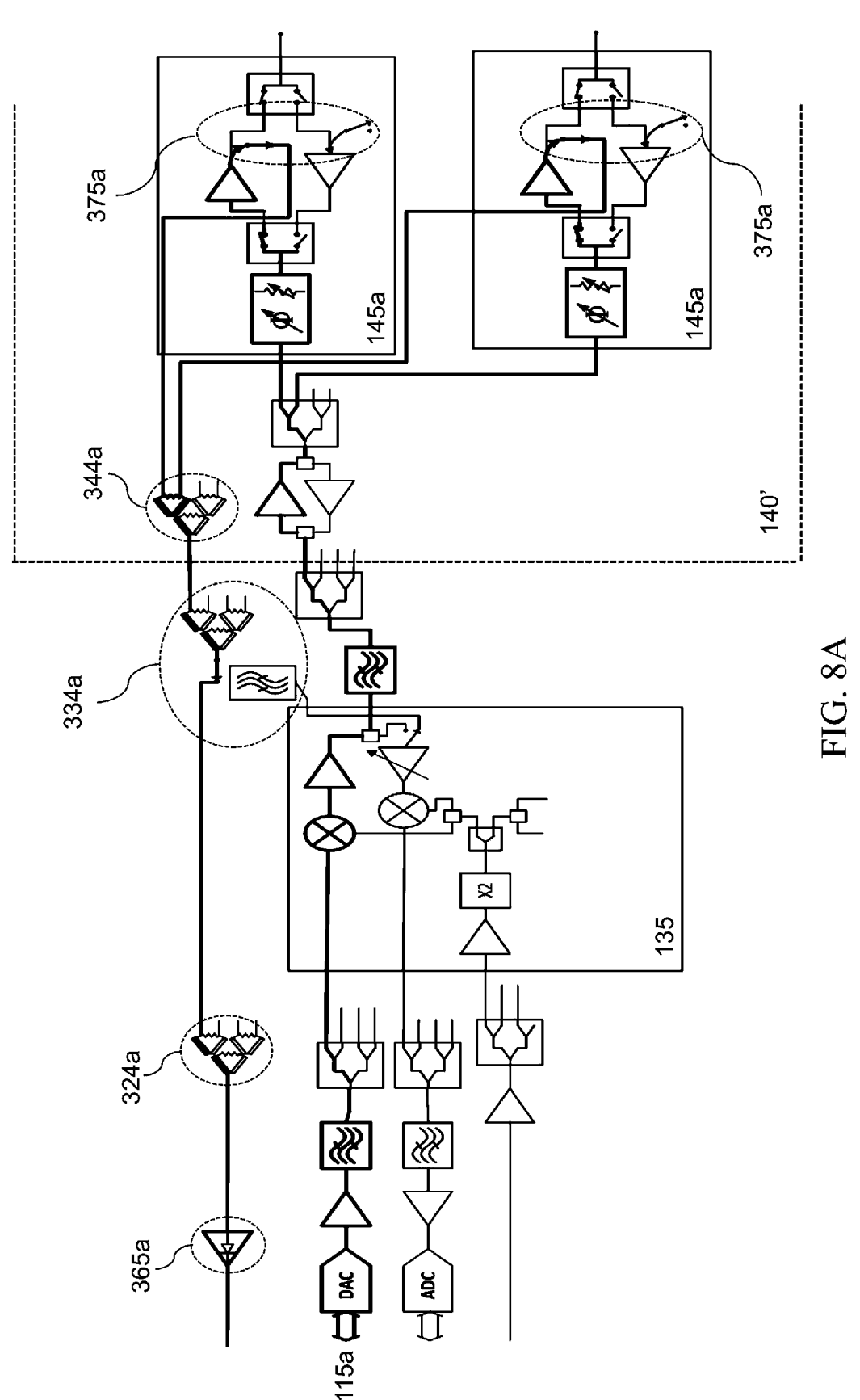
FIG. 8A shows an embodiment according to the present disclosure of a configuration of the plurality of switchable feedback paths for calibrating phase and amplitude of transmit paths of the transceiver system.

FIG. 8A shows an embodiment according to the present disclosure of a configuration of the plurality of switchable feedback paths for calibrating phase and amplitude of transmit paths of the transceiver system of FIG. 3, wherein the highlighted regions/elements in the figure trace signal paths enabled by the switchable feedback paths for the calibration. As can be seen in FIG. 8A, the calibration can be performed during an active transmit phase of two transmit paths, one of the two transmit paths (arbitrarily) used as a reference path and the other used as a target path for calibration. As previously described, calibration may be performed via adjustment of the phase and amplitude adjustment block (e.g., 148a of FIGS. 4A-4D) of a (switchable) transmit and receive RF processing path (145a) of the target path. In FIG. 8A, any one of the two transmit and receive processing paths (145a) may be considered part of the target path and the other, part of the reference path.

With continued reference to FIG. 8A, an RF signal based on a single transmit data signal (115a) is provided to the two transmit and receive processing paths (145a) via corresponding (highlighted) conduction paths (i.e., same as normal operation). The switchable element (375a) of the feedback path coupled to each of the two transmit and receive processing paths (145a) is set according to FIG. 4A as to provide a portion of the transmitted RF signal (e.g., $RF_{FB}$ per FIG. 4A) to the feedback path for combination (i.e., summation) through the power combiner (344a) per FIG. 5. Furthermore, by setting the switchable element (375a) coupled to other transmit and receive paths (145a) for normal operation (e.g., feedback paths are switched off) without calibration, as shown in FIG. 4A, a sum of only the two RF signals through the reference path and the target path can be provided to the envelope detection circuit (365a). Accordingly, calibration of phase and amplitude of the target path as described with reference to, for example, FIGS. 7A-7C can be performed. Once calibrated, the target path can be changed to a next/different target path until all (or a group of) the paths are calibrated with respect to one (and a same) reference path.

With continued reference to FIG. 8A, according to some embodiments of the present disclosure, a calibration verification process can be devised wherein calibration is performed with respect to one or more different reference paths, in other words, the reference path is rotated. Such calibration verification process can reduce inconsistencies in calibration due to, for example, a transmit path with a performance (e.g., with respect to a phase and/or amplitude response) that substantially deviates from performance of a majority of the transmit paths. It should be noted that in the configuration depicted in the FIG. 8A, the switchable element (334a) of the switchable feedback path is set according to the configuration depicted in FIG. 6A for routing of the combined feedback RF signal to the envelope detector (365a).

The calibration verification process according to the present teachings may highlight (outlier) transmit paths of higher performance deviation. Such higher performance deviation may be due to variation in performance of corresponding power amplifiers (e.g., 146a of FIG. 4A). A person skilled in the art would clearly understand that such variation in performance may be due to a phase and/or amplitude response of the power amplifiers operating in saturation. It follows that according to an exemplary embodiment of the present disclosure, the power amplifiers of the outlier transmit paths may be operated away from their respective saturation regions so to bring their performance in line with power amplifiers of other transmit paths.

Because of a relatively high amplitude of an RF signal in a transmit path of the transceiver system (300), a higher isolation between conduction paths of the two polarizations is desired. Accordingly, the feedback paths of the present teachings may not couple (e.g., via power combiners/dividers, switchable elements, etc.) transmit paths of different polarizations, as such couplings, even if switchable, may affect the higher isolation. It follows that according to an embodiment of the present disclosure, phase and amplitude calibration of the transmit paths as described above may be performed within a respective polarization. This is shown in FIG. 8A wherein the suffix a indicates paths of same polarization. According to further embodiments of the present disclosure, calibration of the transmit paths of the two polarizations may be performed in parallel. In other words, while the transmit paths of a first polarization are being calibrated, transmit paths of the second polarization may be calibrated concurrently.

Figure 8B:
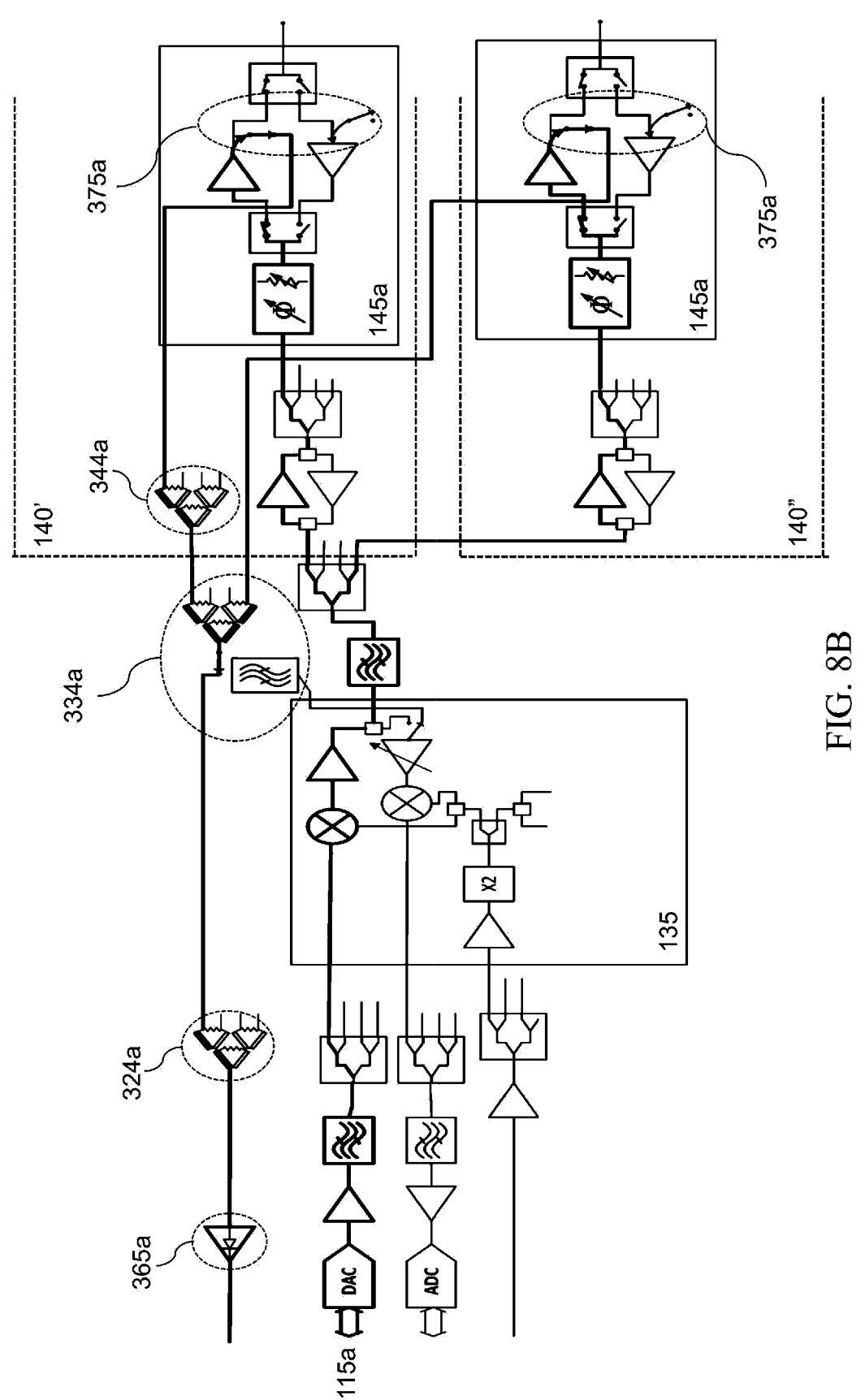
FIG. 8B shows another embodiment according to the present disclosure of a configuration of the plurality of switchable feedback paths for calibrating phase and amplitude of transmit paths of the transceiver system.
Figure 8C:
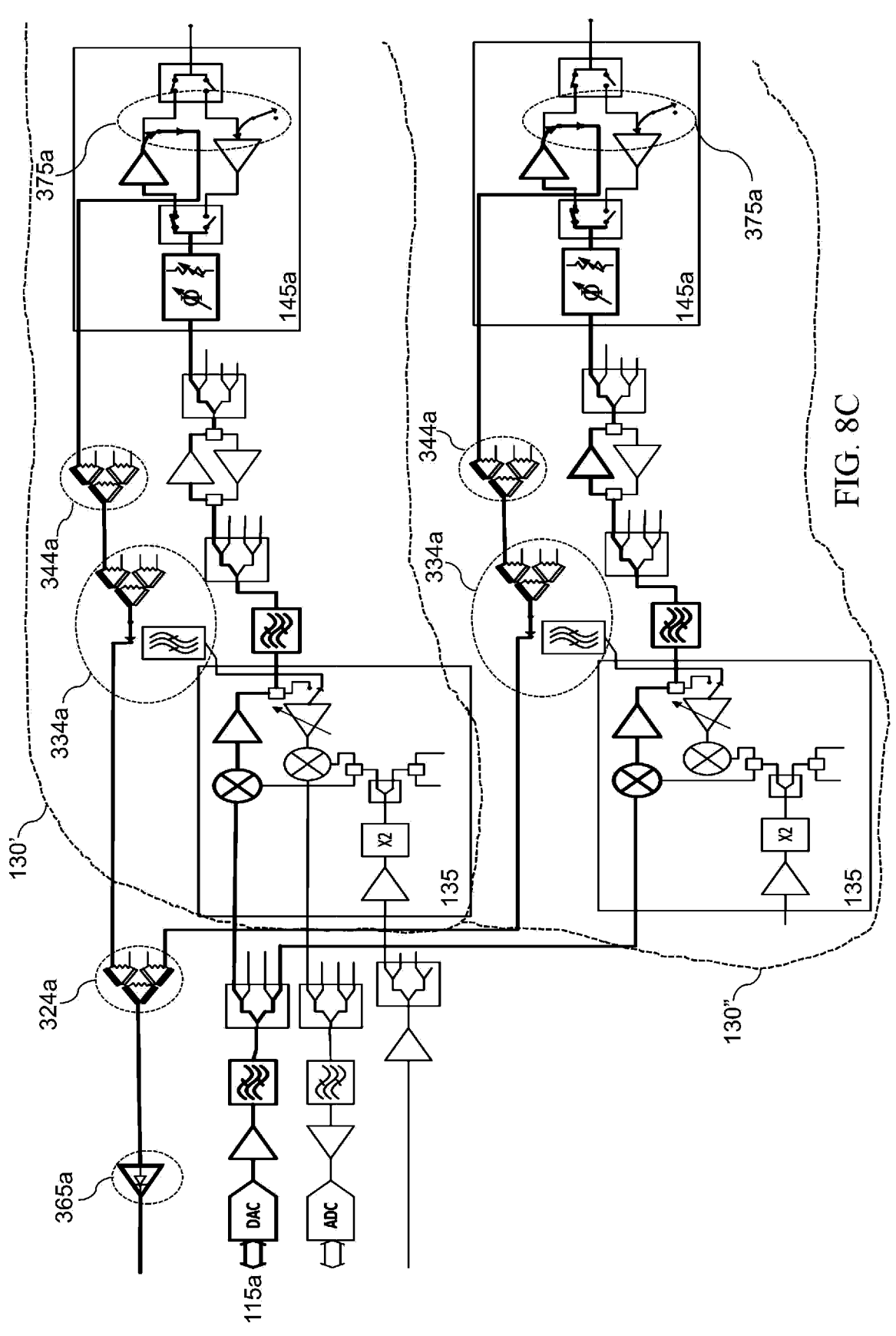
FIG. 8C shows yet another embodiment according to the present disclosure of a configuration of the plurality of switchable feedback paths for calibrating phase and amplitude of transmit paths of the transceiver system.

With continued reference to FIG. 8A, calibration of the transmit paths may be provided for transmit paths having corresponding (switchable) transmit and receive RF processing paths (145a) part of a same RF processing block (e.g., 140') as shown in FIG. 8A, or part of different RF processing blocks (e.g., any one of 140', 140", 140'" and 140"" of FIG. 3) as shown in FIG. 8B, or part of different IF-RF blocks (e.g., any one of 130', 130", 130'" and 130"" of FIG. 3) as shown in FIG. 8C. In other words, as the exemplary configuration of FIG. 3 can be partitioned in many different ways (as previously described), calibration of the transmit paths (and receive paths) according to the present teachings can be equally applied for any partitioning of the blocks of the transceiver system (300) shown in FIG. 3.

Figure 9:
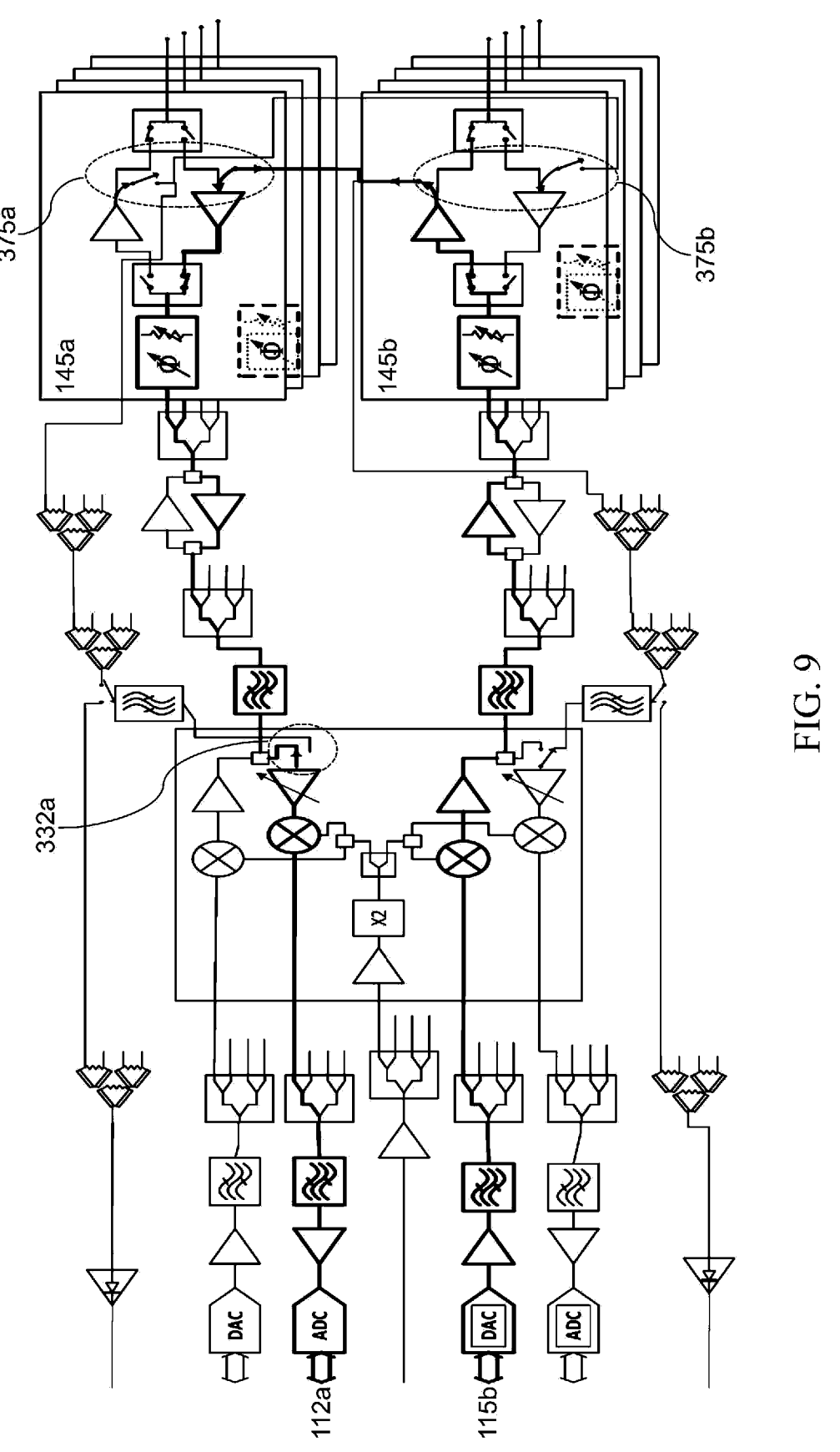
FIG. 9 shows an embodiment according to the present disclosure of a configuration of the plurality of switchable feedback paths for calibrating phase and amplitude of receive paths of the transceiver system, based on calibrated transmit paths.

FIG. 9 shows an embodiment according to the present disclosure of a configuration of the plurality of switchable feedback paths for calibrating phase and amplitude of receive paths of the transceiver system of FIG. 3 based on the calibrated transmit paths, wherein the highlighted regions/elements in the figure trace signal paths enabled by the switchable feedback paths for the calibration. Similar to the calibration of the transmit paths described above with reference to FIGS. 8A-8C, calibration of the receive paths according to the present teachings may be performed by feeding a (substantially) same RF signal to a reference receive path and to a target receive path, equalizing phase and amplitude of the target receive path to the reference receive path via a corresponding phase and amplitude adjustment block (e.g., 148a of FIGS. 4A-4D) and repeating the calibration for each of the target receive paths using the same reference receive path. Once done, the reference receive path may be rotated to verify the calibration in a manner similar to one described above with reference to the calibration of the transmit paths. Accordingly, calibration of the phase and amplitude equalizes phase and amplitude through the target paths and the reference path. Values of the phase and amplitude adjustment blocks (148a, 148b) may therefore be considered as offset values with respect to a reference value (e.g., of the reference path). Accordingly, offset values (e.g., weights) for equalization between any two paths can be established. It would be clear to a person skilled in the art that such offset values relate to equalization of the paths when operating in a receive mode and may be different from the offset values derived for operation in a transmit mode as described above with reference to for example FIGS. 8A-8B.

With continued reference to FIG. 9, calibration of the phase and amplitude of the receive paths according to the present teachings may be performed within a same polarization. For example, as can be seen in FIG. 9, the reference receive path and the target receive path each includes a (switchable) transmit and receive RF processing path (145a) that is part of the same polarization. Each of such transmit and receive RF processing path (145a) includes a respective phase and amplitude adjustment block (148a), wherein in the figure, one is shown in a dotted box. Each transmit and receive RF processing path of the reference and target receive paths (145a) is configured according to the configuration of FIG. 4C for receiving a test signal (e.g., RF$_{RXin}$ of FIG. 4C). Accordingly, calibration of the phase and amplitude of the receive paths can be performed while the receive paths are not active (e.g. coupled to the antenna array 160).

With continued reference to FIG. 9, calibration of the phase and amplitude of the receive paths according to the present teachings is provided by reusing the receive paths while not active. Accordingly, as can be seen in FIG. 9, the sum of the RF signals through the reference and the target receive paths is conducted through a normal receive path of the transceiver system (e.g., 300 of FIG. 3) which is modified to include the switching element (332a) described above with reference to, for example, FIGS. 6A-6B. The down converted sum is provided to the digital signal processing block (110) as a receive data signal whose phase and amplitude can be detected via circuits that are part, or can communicate with, the digital signal processing block (110). Calibration, e.g., equalization, of the phase and amplitude of the target receive path can be provided in a manner similar to the calibration of the target transmit path, wherein a null is first detected by sweeping the phase of the RF signal through the target path, and then a level of the null is minimized by sweeping the gain/attenuation of the RF signal through the target path.

With further reference to FIG. 9, according to an embodiment of the present disclosure the RF signal through the reference and target receive paths may be based on RF signals through equalized/calibrated transmit paths of a polarization (e.g., polarization b per FIG. 9) different from the polarization (e.g., polarization a per FIG. 9) of the reference and target receive paths. This is shown in FIG. 9, wherein the reference and target receive paths each receive a respective RF signal from a corresponding (e.g., dual) calibrated transmit path which includes a (switchable) transmit and receive RF processing path (145b). Accordingly, elements (145a) of the reference and target receive paths and elements (145b) of the corresponding transmit paths are configured and coupled according to the description above with reference to FIG. 4D.

As can be seen in FIG. 9, according to an exemplary embodiment of the present disclosure, the calibration of the receive paths may be performed during an active transmit phase (i.e., transmit mode of operation) of the two corresponding transmit paths that are used to provide equalized RF signals to the receive paths. According to another exemplary embodiment of the present disclosure, calibration of the receive paths may be based on RF signals through the corresponding transmit paths, the RF signals having small signal amplitudes that may be provided via test signals generated specifically for the calibration during a non-active phase of the transmit and receive RF paths.

With continued reference to FIG. 9, it should be clear to a person skilled in the art that the corresponding transmit paths used in the calibration of the receive paths may be configured to provide to the reference and target receive paths RF signals having a substantially same phase and amplitude. This can be accomplished based on the calibrated phase and amplitude values of the phase and amplitude adjustment blocks (e.g., 148b of FIG. 4D) of the corresponding transmit paths. According to an exemplary embodiment of the present disclosure, the transmit paths are respective dual paths of the receive path participating in the calibration so to conserve/maintain a desired higher isolation across the transmit and receive paths of the transceiver system of FIG. 3 while providing means (feedback paths) for calibration.

Figure 10A:
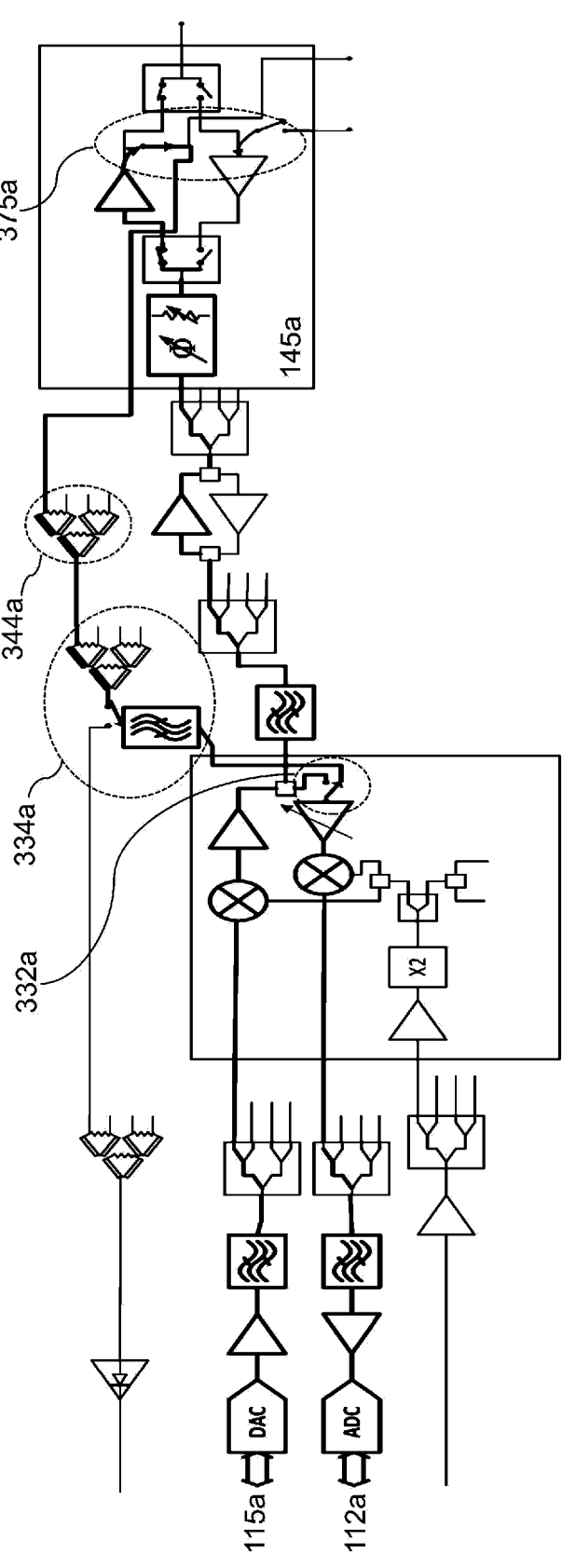
FIG. 10A shows an embodiment according to the present disclosure of a configuration of the plurality of switchable feedback paths for providing a feedback RF signal based on a transmit path RF signal that can be used as pre-distortion feedback for linearization of the transmit path.

FIG. 10A shows an embodiment according to the present disclosure of a configuration of the plurality of switchable feedback paths of the transceiver system of FIG. 3 for providing a portion of an RF signal through an active transmit path as a pre-distortion feedback that can be used for linearization of the transmit path. As can be seen in FIG. 10A, the switchable elements (375a, 334a, 332a) of a feedback path coupled to the (switchable) transmit and receive RF processing path (145a) of the active transmit path are configured according to the configurations described above with reference to FIG. 4B and FIG. 6B.

With continued reference to FIG. 10A, a feedback RF signal that is based on (e.g., a portion of) an RF signal that is amplified by the transmit and receive RF processing path (145a) is fed back, via the switchable feedback path, as a receive data signal (e.g., 112a) to the digital processing block (110). As described above with reference, for example to FIG. 2 and FIG. 3, such feedback RF signal can be used to linearize the transmit path using known in the art SISO DPD algorithms. Although the exemplary configuration of FIG. 10A shows a feedback based on a single active transmit path, teachings according to the present disclosure can extend to a configuration wherein the feedback RF signal is based on a combination (i.e., summation) of portions of RF signals amplified by a plurality of active transmit paths as shown in FIG. 10B. In other words, as previously described, a known in the art SISO DPD algorithm operating on a combined RF signal from the plurality of active transmit paths shown in FIG. 10B may be used as a pre-distortion feedback to linearize the plurality of transmit paths.

Figure 10B:
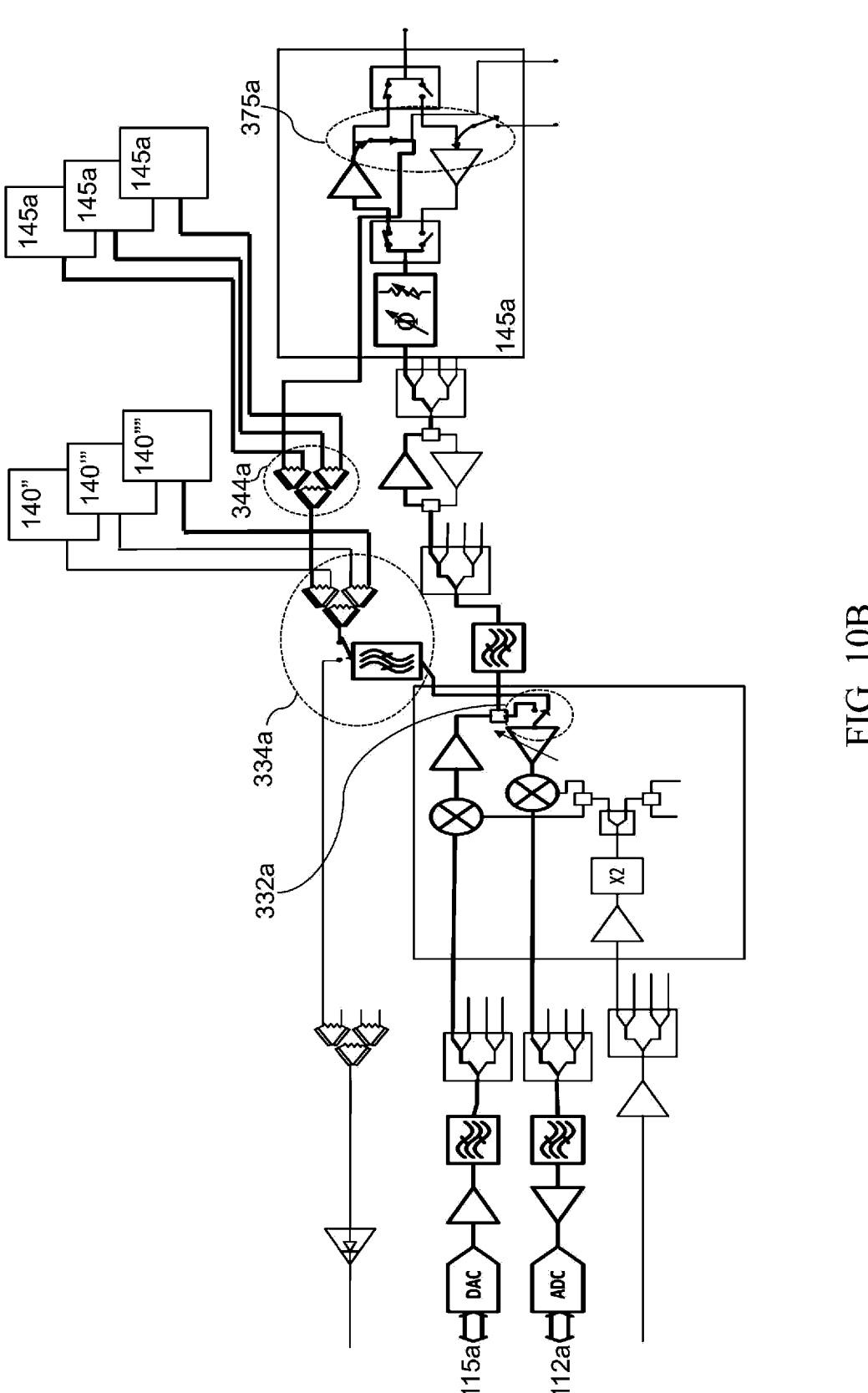
FIG. 10B shows an embodiment according to the present disclosure of a configuration of the plurality of switchable feedback paths for providing a combined feedback RF signal based on a combination of RF signals of a plurality of transmit paths, wherein the combined feedback RF signal can be used as pre-distortion feedback for linearization of the plurality of transmit paths.

With continued reference to FIGS. 10A and 10B, according to an embodiment of the present disclosure, phase and amplitude of the active transmit paths that provide the feedback RF signal as pre-distortion feedback may be calibrated according to the phase and amplitude calibration techniques of the present teachings. Accordingly, the feedback RF signal that is used as a "model" for characterization of a combined distortion of the plurality (or a group) of active transmit paths may be referred to as a weighted summation of RF signals through each of the plurality (or group) of active transmit paths, each with a weight that is equal to corresponding calibration offset values.

A person skilled in the art is well aware of different methods for implementing beam forming and/or steering, wherein spatial control (e.g., steering angle) of a combined emitted beam may be performed with respect to an elevation and/or an azimuth of the beam. Such control may be achieved via phase and amplitude control of a (dual polarized) transmitted RF signal to each of the elements (e.g., 160$mn$, 160$mk$, . . . of FIG. 1C) of the antenna array (160). In cases wherein the beam forming/steering can maintain a small variation in the elevation or azimuth, the elements of the antenna array (160) may be grouped according to a same column or row, each such grouping capable of emitting concurrently a different beam according to a substantially same elevation or azimuth. In such cases, the feedback RF signal may be based on such grouping, such as to separately linearize the groups. In cases wherein the beam forming includes large variations in elevation and/or azimuth, a signal aware controller may group the transmit path according to groups with similar or close elevation and/or azimuth for piecewise linearization.

FIG. 11A is a process chart (1100$a$) showing various steps of a method for calibrating RF paths of a transceiver circuit used in a time division duplex system, the method comprising a transmit path calibration mode according to the present teachings. As can be seen in the process chart (1100$a$), during the transmit path calibration mode, the method comprises: switchable elements of the transceiver circuit couple a portion of a phase and amplitude adjusted RF signal through each of an arbitrarily selected reference transmit path and a target transmit path of switchable transmit and receive RF processing paths of the transceiver system to one or more RF combiners to obtain a combined RF signal for calibration of the target transmit path, per step (1110$a$); an envelope of the combined RF signal is detected through an envelope detector circuit of the transceiver circuit, per step (1120$a$), and a phase of the RF signal through the target transmit path is adjusted to detect a null of the envelope of the combined RF signal, thereby calibrating the target transmit path, per step (1130$a$).

FIG. 11B is a process chart (1100$b$) showing various steps of a method for calibrating RF paths of a transceiver circuit used in a time division duplex system, the method comprising a transmit path linearization mode according to the present teachings. As can be seen in the process chart (1100$b$), during the transmit path linearization mode, the method comprises: switchable elements of the transceiver circuit couple a portion of a phase and amplitude adjusted RF signal through each of one or more transmit paths of switchable transmit and receive RF processing paths of the transceiver system to one or more RF combiners to obtain a combined RF signal, while other portion of the phase and amplitude adjusted RF signal is coupled to a respective element of an antenna array, per step (1110$b$), and the combined RF signal is down converted and a down converted signal is provided to a controller for linearization of the one or more transmit paths, per step (1120$b$).

Based on the above description, a person skilled in the art would realize that the transceiver system described above may be used not only in beam forming/steering applications, but also in other RF applications wherein the transceiver is coupled to a plurality of antenna elements. Furthermore, it is noted that the herein described elements and instrumentation of the disclosed transceiver system may also be used in other applications beyond the described calibration of the transmit/receive paths and linearization of the transmit paths. Such other applications may include, for example, built-in system test (BIST), wherein the transceiver system may (automatically) perform upon power up checking of various functions and performances of the system and generate corresponding status (flags).

Reduced layout size advantage provided by the configurations according to the present teachings may allow further reduction of a monolithically integrated circuit using such configurations. A person skilled in the art would realize that monolithic integration of any of the configurations described above, either in their entireties or partially, may be possible as well, depending on desired implementation goals.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

The term "MOSFET", as used in this disclosure, means any field effect transistor (FET) with an insulated gate and comprising a metal or metal-like, insulator, and semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable IC technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, the invention may be implemented in other transistor technologies such as bipolar, GaAs HBT, GaN HEMT, GaAs pHEMT, and MESFET technologies. However, the inventive concepts described above are particularly useful with an SOI-based fabrication process (including SOS), and with fabrication processes having similar characteristics. Fabrication in CMOS on SOI or SOS enables low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted or voltage and/or logic signal polarities reversed depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functional without significantly altering the functionality of the disclosed circuits.

A number of embodiments according to the present disclosure have been described. It is to be understood that various modifications may be made without departing from the spirit and scope of such embodiments. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the disclosure, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

LIST OF REFERENCES

Reference [1]: "*Single-Input Single-Output Digital Predistortion of Power Amplifier Arrays in Millimeter Wave RF Beamforming Transmitters*" by Eric Ng et al., Department of Electrical and Computer Engineering, University of Waterloo, Waterloo, ON, Canada, published in 2018 IEEE/MTT-S International Microwave Symposium.
Reference [2]: "*A Digital Predistortion Scheme Exploiting Degrees-of-Freedom for Massive MIMO Systems*" by Miao Yao et al., Dept. of Electrical and Computer Engineering, Virginia Tech, published as arXiv: 1801.06023v1 [eess.SP] 18 Jan. 2018.

The invention claimed is:

1. A transceiver circuit comprising:
a plurality of RF transmit paths for transmission of a plurality of respective RF signals through a plurality of respective elements of an antenna array;
a plurality of RF receive paths for reception of a plurality of respective RF signals through the plurality of respective elements of the antenna array; and
an RF combiner circuit selectively coupled to the plurality of RF transmit paths and/or to the plurality of RF receive paths,
wherein during a transmit path linearization mode of operation,
i) one or more RF transmit paths of the plurality of RF transmit paths are coupled to the respective elements of the antenna array, and
ii) the RF combiner circuit is configured to combine portions of the respective RF signals through the one or more RF transmit paths into a combined RF signal that is configured to be used by a controller for linearization of the one or more RF transmit paths.

2. The transceiver circuit according to claim 1,
wherein the RF combiner circuit comprises a plurality of RF combiners selectively coupled to the plurality of RF transmit paths and/or to the plurality of RF receive paths via a plurality of switches.

3. The transceiver circuit according to claim 1,
wherein the RF combiner circuit comprises a plurality of bidirectional signal paths that are selectively coupled to the plurality of RF transmit paths and/or to the plurality of RF receive paths.

4. The transceiver circuit according to claim 3,
wherein during the transmit path linearization mode of operation, the one or more RF transmit paths are coupled to one or more of the plurality of bidirectional signal paths, and
wherein during a reception mode of operation, one or more of the plurality of RF receive paths are coupled to the one or more of the plurality of bidirectional signal paths.

5. The transceiver circuit according to claim 1,
wherein the combined RF signal is used by the controller as a pre-distortion feedback to a single input single output (SISO) digital pre-distortion algorithm.

6. The transceiver circuit according to claim 5,
wherein the transceiver circuit further comprises a mixer circuit, and
wherein in the transmit path linearization mode,
i) an input of the mixer circuit is coupled to the combined RF signal that is used as the pre-distortion feedback, and
ii) the mixer circuit generates a down converted signal corresponding to the combined RF signal for use by the controller.

7. The transceiver circuit according to claim 6,
wherein based on the down converted signal, the SISO digital pre-distortion algorithm generates pre-distortion components that are used to generate a pre-distorted transmit data signal for transmission through the one or more RF transmit paths that are coupled to the respective elements of the antenna array.

8. The transceiver circuit according to claim 7,
wherein the pre-distorted transmit data signal is up converted by the mixer prior to the transmission.

9. The transceiver circuit according to claim 1,
wherein the one or more RF transmit paths comprises a plurality of transmit paths arranged as different groups of transmit paths.

10. The transceiver circuit according to claim 9,
wherein each group of the different groups of transmit paths forms a respective combined emitted RF beam through a respective group of elements of the antenna array according to a respective substantially same elevation or azimuth.

11. The transceiver circuit according to claim 10,
wherein the respective group of elements of the antenna arrays form a row or a column of the antenna array.

12. The transceiver circuit according to claim 10,
wherein the different groups of transmit paths are linearized through the transmit path linearization mode at a different time.

13. The transceiver circuit according to claim 1,
wherein each RF receive path of the plurality of RF receive paths is configured to adjust a phase or an amplitude of the respective RF signal received through the respective element of the antenna array.

14. The transceiver circuit according to claim 1,
wherein each RF transmit path of the one or more RF transmit paths is configured to adjust a phase or an amplitude of the respective RF signal for transmission through the respective element of the antenna array.

15. The transceiver circuit according to claim 14, wherein each RF transmit path of the one or more RF transmit paths comprises an amplifier that is configured to output a phase and amplitude adjusted RF signal, and wherein the RF combiner circuit further comprises:

a power coupler that is coupled to an output of the amplifier, the power coupler configured to generate from the output of the amplifier the portion of the phase and amplitude adjusted RF signal; and a first switch that is coupled via a common pole of the first switch to a terminal of the power coupler that carries the portion of the phase and amplitude adjusted RF signal.

16. The transceiver circuit according to claim 15, further comprising:

an antenna switch that is configured to selectively couple a same element of the plurality elements of the antenna array to a respective RF transmit path or to a respective RF receive path.

17. The transceiver circuit according to claim 1, wherein the plurality of RF transmit paths and RF receive paths are grouped in pairs according to a first polarization and a second polarization, and wherein the transmit path linearization mode for RF transmit paths associated to the first polarization is independent from the transmit path linearization mode for RF transmit paths associated to the second polarization.

18. The transceiver circuit according to claim 17, wherein the transmit path linearization mode for RF transmit paths associated to the first polarization is enabled concurrently with the transmit path linearization mode for RF transmit paths associated to the second polarization.

19. The transceiver circuit according to claim 1, wherein transistors of the transceiver circuit comprise metal-oxide-semiconductor (MOS) field effect transistors (FETs).

20. The transceiver circuit according to claim 19, wherein said transistors are fabricated using one of: a) silicon-on-insulator (SOI) technology, b) silicon-on-sapphire (SOS) technology, and c) bulk silicon (Si) technology.

21. The transceiver circuit according to claim 1, wherein transceiver circuit is monolithically integrated.

22. An electronic module comprising the transceiver circuit of claim 1.

23. A radio frequency (RF) front-end communication system, comprising:

a transmitter and receiver section for selectively transmitting and receiving a plurality of RF signals to/from the plurality of elements of the antenna array, the transmitter and receiver section comprising the transceiver circuit of claim 2.

24. The radio frequency (RF) front-end communication system according to claim 23, wherein said system is used in a phased array.

25. The radio frequency (RF) front-end communication system according to claim 24, wherein said system processes RF signals to generate a beam forming or beam steering of the phased array.

* * * * *